(12) United States Patent
Matsuoka et al.

(10) Patent No.: US 7,969,713 B2
(45) Date of Patent: Jun. 28, 2011

(54) SOLID ELECTROLYTIC CAPACITOR

(75) Inventors: Keiko Matsuoka, Izumisano (JP); Shoji Umeda, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 277 days.

(21) Appl. No.: 12/329,833

(22) Filed: Dec. 8, 2008

(65) Prior Publication Data

US 2009/0147447 A1  Jun. 11, 2009

(30) Foreign Application Priority Data

Dec. 7, 2007 (JP) ................. 2007-317415

(51) Int. Cl.
*H01G 4/228* (2006.01)
*H01G 5/38* (2006.01)
*H01G 9/10* (2006.01)

(52) U.S. Cl. ................. 361/540; 361/541; 361/538

(58) Field of Classification Search ............... 361/540, 361/541, 535, 538, 539, 533, 531
See application file for complete search history.

(56) References Cited

U.S. PATENT DOCUMENTS

| | | | |
|---|---|---|---|
| 5,781,401 A * | 7/1998 | Tomiyasu et al. | ............. 361/303 |
| 2004/0105197 A1 | 6/2004 | Kamigawa et al. | |
| 2006/0056136 A1* | 3/2006 | Fujii et al. | ..................... 361/540 |

FOREIGN PATENT DOCUMENTS

| | | | |
|---|---|---|---|
| JP | 2002-367862 A | | 12/2002 |
| JP | 2005353709 A | * | 12/2005 |
| JP | 2006-108626 A | | 4/2006 |
| JP | 2006-319113 A | | 11/2006 |
| KR | 20040048835 A | | 6/2004 |

OTHER PUBLICATIONS

Korean Office Action dated Nov. 10, 2010, issued in corresponding Korean Patent Application No. 10-2008-0110384.

* cited by examiner

*Primary Examiner* — Eric Thomas
(74) *Attorney, Agent, or Firm* — Westerman, Hattori, Daniels & Adrian, LLP

(57) ABSTRACT

A solid electrolytic capacitor includes a capacitor element, an anode lead frame, a cathode lead frame, and a mold resin portion. The anode lead frame includes an anode terminal portion and a rising portion. The rising portion is formed integral with the anode terminal portion, extends from the anode terminal portion through the mold resin and is connected to an anode portion. At the rising portion, a catching portion receiving and supporting the anode portion from below and a hook portion surrounding and holding an outer circumferential surface of the anode portion, with the anode portion received in the catching portion, are formed. Therefore, a solid electrolytic capacitor can be provided, which allows highly accurate attachment of the capacitor element on the lead frame without applying any additional member and reduces equivalent series resistance.

18 Claims, 25 Drawing Sheets

SOLID ELECTROLYTIC CAPACITOR

BACKGROUND OF THE INVENTION

1. Field of the Invention

The present invention relates to a solid electrolytic capacitor and, more specifically, to a solid electrolytic capacitor having a capacitor element mounted on a prescribed lead frame and sealed with mold resin portion.

2. Description of the Background Art

A solid electrolytic capacitor is one of electronic components that can be surface-mounted on a printed circuit board or the like. As shown in FIG. 41 or 42, a solid electrolytic capacitor 101 of this type includes a capacitor element 102, an anode lead frame 110, a cathode lead frame 120 and a mold resin portion 140 sealing these components. Capacitor element 102 has a substantially columnar (rectangular parallelepiped) anode body 103, an anode portion 104 protruded from the body, and a cathode portion 105 formed on an outer surface surrounding anode body 103. Anode lead frame 110 is electrically connected to anode portion 104 with a pillow member 180 interposed, and cathode lead frame 120 is electrically connected directly to cathode portion 105. Other than the pillow member, a member of different shape, formed to have a prescribed shape, is also used in some capacitors.

Solid electrolytic capacitor 101 of this type is manufactured in the following manner. First, a lead frame is punched out to have a prescribed shape, whereby a portion to be the anode lead frame and a portion to be the cathode lead frame are formed. Next, a conductive pillow member is welded on the portion to be the anode lead frame. Next, the anode portion of capacitor element is placed at a prescribed position with respect to the welded pillow member, and the cathode portion is placed at a prescribed position on the portion to be the cathode lead frame, and the capacitor element is attached to the lead frame.

Next, the portion to be the anode lead frame, the portion to be the cathode lead frame and the capacitor element are surrounded by a prescribed metal mold, and mold resin is poured to the metal mold, so that the capacitor element and the like are sealed. Thereafter, the mold resin portion sealing the capacitor element and the like is cut out at a prescribed position from the lead frame, and the solid electrolytic capacitor is completed. In the solid electrolytic capacitor, a part of anode lead frame and a part of cathode lead frame protrude as terminals, from the mold resin portion.

A method of welding the pillow member at the anode portion of capacitor element has also been proposed, rather than welding the pillow member at the portion to be the anode lead frame. The solid electrolytic capacitors of this type are disclosed, for example, in Japanese Patent Laying-Open Nos. 2006-319113 and 2002-367862.

The conventional solid electrolytic capacitor 101, however, has the following problems. As described above, in order to electrically connect anode portion 104 and anode lead frame 110 of capacitor element 102, pillow member 108 is positioned between anode portion 104 and anode lead frame 110. Therefore, when attaching capacitor element 102 to the lead frame, an additional member is required, and a process step of welding the pillow member 108 as such to the lead frame is additionally required, hindering reduction of manufacturing cost.

Further, when pillow member 180 is welded on anode portion 104 of capacitor element 102, location or strength of welding may vary, making it difficult to attach capacitor element 102 to the lead frame with high accuracy. This leads to lower production yield of solid electrolytic capacitor 101.

Further, contact area between anode portion 104 and pillow member 180 is limited and, therefore, there is a limit in reducing equivalent series resistance of capacitor element 102.

SUMMARY OF THE INVENTION

The present invention was made to solve the above-described problem, and its object is to provide a solid electrolytic capacitor allowing highly accurate and reliable attachment of the capacitor element on the lead frame without applying any additional member and allowing reduction of equivalent series resistance.

The solid electrolytic capacitor in accordance with the present invention includes a capacitor element, a mold resin portion, an anode lead frame and a cathode lead frame. The capacitor element has an anode portion and a cathode portion. The mold resin portion seals the capacitor element. The anode lead frame is connected to the anode portion from below the anode portion of the capacitor element, inside the mold resin portion. The cathode lead frame is connected to the cathode portion. The anode lead frame includes a catching portion and a hook portion. The catching portion receives and supports the anode portion from below. The hook portion holds the anode portion in a surrounding manner, with the anode portion received in the catching portion.

In this structure, the anode portion of the capacitor element is connected to the anode lead frame from below, inside the mold resin portion. Therefore, as compared with the solid electrolytic capacitor having the pillow member interposed between the lead frame and the anode portion, the additional pillow member becomes unnecessary, and the process step of welding the pillow member to the lead frame becomes unnecessary, whereby manufacturing cost can be reduced. Further, the anode portion is received by the catching portion and held by the hook portion, so that the capacitor element can be attached to the anode lead frame with high accuracy.

As to the specific structure of the anode lead frame, the anode lead frame includes an anode terminal portion exposed along a bottom surface of the mold resin portion, and a rising portion formed integral with the anode terminal portion, and connected to the anode portion, and preferably, the catching portion and the hook portion are formed at the rising portion.

Further, in order to ensure sufficient contact area between the rising portion and the anode portion, preferably, the catching portion includes a plane-contact portion to be in plane contact with a surface of the anode portion. Further, preferably, the catching portion includes a line-contact portion to be in line contact with a surface of the anode portion.

Further, preferably, the rising portion extends from an end of the anode terminal portion closer to the cathode portion of the capacitor element through the mold resin portion toward the anode portion of the capacitor element, and is connected to the anode portion.

Consequently, resistance between the anode portion and the anode terminal portion can be reduced.

Further, preferably, the rising portion includes one and the other side end portions positioned in a direction orthogonal to the direction of the rising portion extending from the anode terminal portion, and each of the side end portions is bent in a direction away from the cathode portion of the capacitor element.

By this structure, it becomes possible to reliably prevent deformation or falling of the rising portion, when the anode portion is surrounded by the hook portion. Further, as the side end portion is bent, closer contact to the mold resin portion can be attained.

Preferably, the anode lead frame is arranged such that an upper surface of the anode terminal portion is in direct contact with a bottom surface of the mold resin portion.

Here, an end of metal mold cavity can be placed close to a prescribed position of the anode lead frame and, as a result, capacity of the cavity can be increased.

Preferably, the cathode lead frame includes a cathode terminal portion exposed along a bottom surface of the mold resin portion, and a pair of side surface portions extending from the cathode terminal portion through a step portion and inside the mold resin portion, erected opposite to each other with the cathode portion of the capacitor element placed therebetween and connected to the cathode portion.

Accordingly, when the capacitor element is attached to the anode lead frame and the cathode lead frame, what is necessary is simply to place the capacitor element at a region between one side surface portion and the other side surface portion, and therefore positioning of capacitor element with respect to each lead frame becomes easier.

Further, preferably, the side surface portion includes a first side surface portion, and a second side surface portion positioned on an opposite side to the anode portion with respect to the first side surface portion.

By this structure, it is possible to reliably have the side surface portion in contact with the cathode portion, well fit to the outer shape of the capacitor element.

Further, the solid electrolytic capacitor preferably includes an extending portion extending from the side surface portion to a side opposite to the anode portion.

This increases contact area between the cathode lead frame and the cathode portion, and the equivalent series resistance can be reduced.

Further, preferably, the cathode lead frame is arranged such that an upper surface of the cathode terminal portion is in direct contact with the bottom surface of the mold resin portion.

Here, an end of metal mold cavity can be placed close to a prescribed position of the anode lead frame and, as a result, capacity of the cavity can be increased.

Further, the number of capacitor elements is not limited to one, and a plurality of capacitor elements may be provided. In that case, preferably, the anode portions of the plurality of capacitor elements are arranged in the same orientation and connected to the anode lead frame.

When a plurality of capacitor elements are mounted, preferably, with respect to one and the other anode portions of one and the other of two capacitor elements adjacent to each other among the plurality of capacitor elements, at the one anode portion, the hook portion is formed to surround the one anode portion from the side of the other anode portion to a side opposite to the other anode portion, and at the other anode portion, the hook portion is formed to surround the other anode portion from the side of one anode portion to a side opposite to the said one anode portion.

In that case, one projection and the other projection having horn-like shapes erected spaced apart from each other at an upper end portion of the anode lead frame are curved to make the space wider from above such that one projection surrounds one anode portion and the other projection surrounds another anode portion, whereby the hook portions are formed.

As to the manner of surrounding the anode portion by the hook portion, the anode portion may protrude like a wire from a body of the capacitor element, and the hook portion may be formed to surround the anode portion from one direction intersecting the direction of protrusion of the anode portion, or the hook portion may be formed to surround the anode from one and the other directions intersecting the direction of protrusion of the anode portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Solid Electrolytic Capacitor

Figure 1:
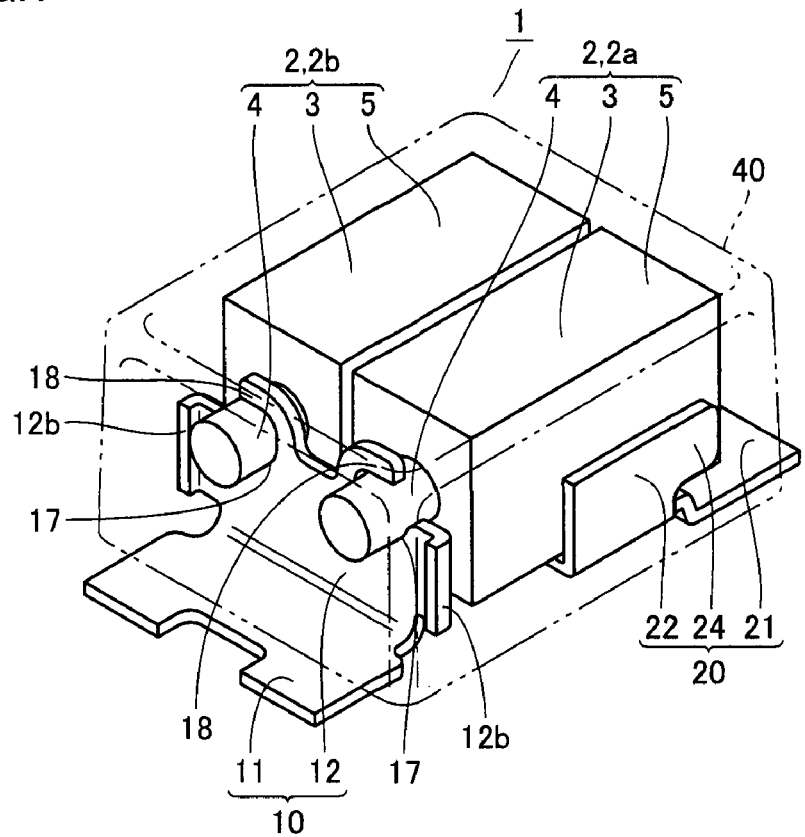
FIG. 1 is a perspective view showing a solid electrolytic capacitor in accordance with an embodiment of the present invention.

The solid electrolytic capacitor in accordance with an embodiment of the present invention will be described. As shown in FIGS. 1 to 4, solid electrolytic capacitor 1 includes two capacitor elements 2, 2a, 2b, an anode lead frame 10, a cathode lead frame 20 and mold resin portion 40 sealing these. Capacitor element 2 has a substantially columnar (rectangular parallelepiped) anode body 3, an anode portion 4 protruded from the body, and a cathode portion 5 formed on an outer surface surrounding anode body 3. The two capacitor elements 2a and 2b are arranged with anode portions 4 facing the same direction.

Anode lead frame 10 has an anode terminal portion 11 and a rising portion 12. Anode terminal portion 11 is exposed along a bottom surface of mold resin portion 40. An upper surface 11a of anode terminal portion 11 is directly in contact with a bottom surface 40a of mold resin portion 40, and upper surface 11a and bottom surface 40a are positioned substantially on one same plane (see FIGS. 2 and 3). Rising portion 12 is formed integrally with anode terminal portion 11. Rising portion 12 extends, from an end of anode terminal portion 11 closer to cathode portion 5 of capacitor element 2 through mold resin portion 40 to anode portions 4, and connected to anode portion 4 from below the anode portions 4 of two capacitors 2a and 2b, respectively.

Rising portion 12 has a catching portion 17 formed to receive and support anode portion 4 from below. Catching portion 17 is formed to have a shape that corresponds to the outer circumferential surface of anode portion 4 to be in contact (plane contact) with the outer circumferential surface. Further, a hook portion 18 is formed surrounding and holding the outer circumferential surface of anode portion 4 when the anode portion 4 is received in catching portion 17. The hook portion 18 is formed by curving a horn-like projection projected upward at an upper end of rising portion 12, to surround anode portion 4.

Figure 4:
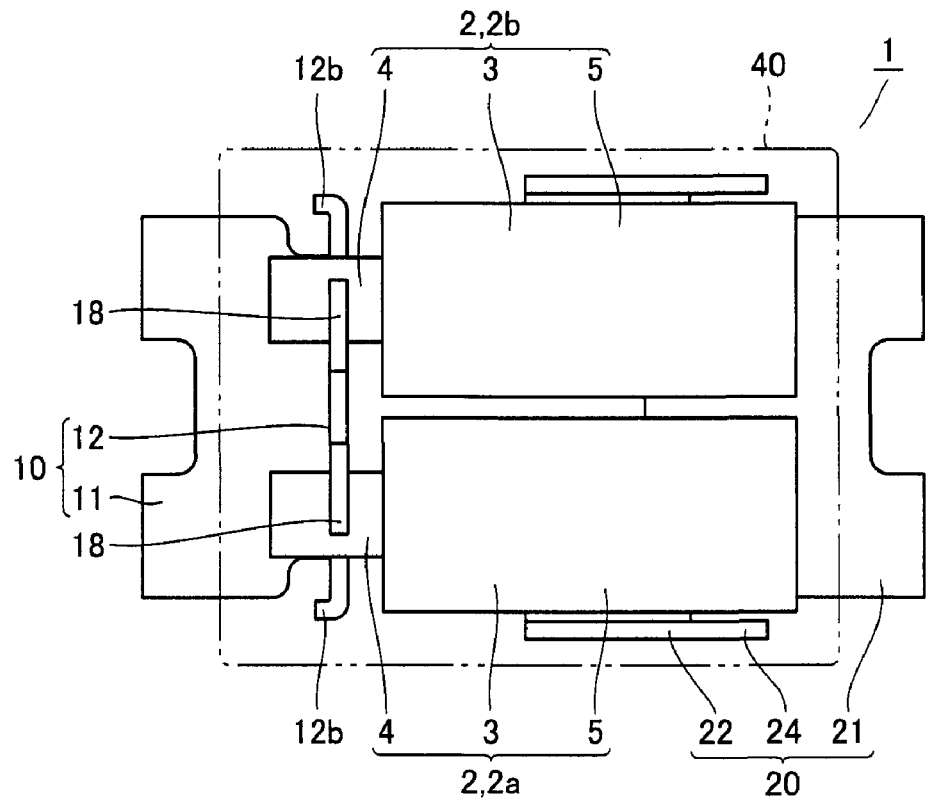
FIG. 4 is a top view of the solid electrolytic capacitor shown in FIG. 1, in accordance with the embodiment.

Further, at rising portion 12, one and the other side end portions 12b in a direction orthogonal to the direction of rising portion 12 extending from anode terminal portion 11 are bent in a direction away from cathode portion 5 of capacitor element 2 (see FIGS. 1 and 4).

Cathode lead frame 20 includes a cathode terminal portion 21, a pair of side surface portions 22, and a step portion 23. Cathode terminal portion 21 is exposed along the bottom surface of mold resin portion 40. An upper surface 21a of cathode terminal portion 21 is directly in contact with bottom surface 40a of mold resin portion 40, and upper surface 21a and bottom surface 40a are positioned substantially on one same plane (see FIG. 3). The pair of side surface portions 22 extend from cathode terminal portion 21 through step portion 23 in mold resin portion 40, and erected opposite to each other with anode body 3 of capacitor element 2 placed therebetween. Side surface portion 22 has an extended portion 24 extending in a direction opposite to the position of anode portion 4.

Lead Frame

Figure 5:
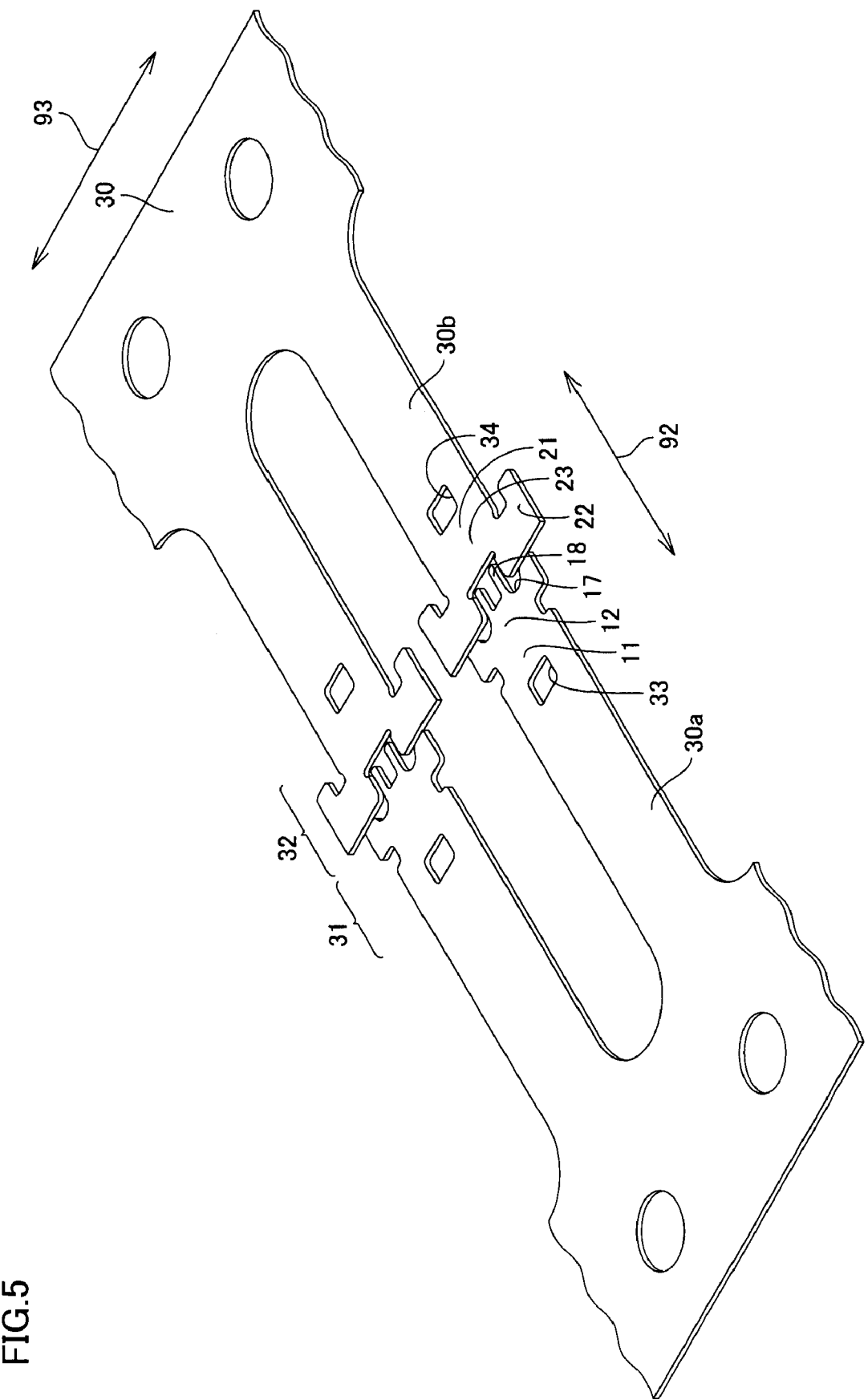
FIG. 5 is a partial perspective view showing a part of the lead frame applied to the solid electrolytic capacitor and showing a step of manufacturing the solid electrolytic capacitor, in accordance with the embodiment.

Next, anode lead frame 10 and cathode lead frame 20 of solid electrolytic capacitor 1 will be described. As shown in FIG. 5, a lead frame 30 is formed by punching out a thin sheet metal extending as a strip (in a direction indicated by an arrow 93) with a prescribed width (in a direction indicated by an arrow 92) to a prescribed shape. It is noted that the direction of arrow 92 is the shorter side direction, and the direction of arrow 93 is the longitudinal direction. A portion 31 to be the anode lead frame is formed at a portion 30a that extends from one end in the shorter side direction of lead frame 30 to the central portion in the shorter side direction. The portion 30a is punched out in a shape of anode terminal portion 11 and rising portion 12 developed two-dimensionally. At a portion connecting anode terminal portion 11 and rising portion 12, in order to ensure bending accuracy when bending rising portion 12 upward, an incurve recess is formed by punching. Further, close to a portion 31 to be the anode lead frame, a fillet hole 33 is formed, which is used for soldering the completed solid electrolytic capacitor to a printed circuit board or the like.

A portion to be the cathode lead frame 32 is formed at a portion 30b that extends from the other end in the shorter side direction of lead frame 30 to the central portion in the shorter side direction. The portion 30b is punched out in a shape of cathode terminal portion 21, side surface portions 22 and step portion 23 developed two-dimensionally. Extended portion 24 provided at side surface portion 22 is formed in a direction opposite to the side where the portion 31 to be the anode lead frame is to be formed, in order to avoid contact with the portion 31 to be the anode lead frame. Further, at a portion connecting side surface portion 22 and cathode terminal portion 21, in order to ensure bending accuracy when bending side surface portion 22 upward, an incurve recess is formed by punching. Further, close to a portion 32 to be the cathode lead frame, a fillet hole 34 is formed, which is used for soldering the completed solid electrolytic capacitor to a printed circuit board or the like.

Method of Manufacturing Solid Electrolytic Capacitor

Next, an exemplary method of manufacturing solid electrolytic capacitor will be described. First, as shown in FIG. 5, a lead frame 30 is formed, which is punched out to the shape of the portion 31 to be the anode lead frame and the portion 32 to be the cathode lead frame developed two-dimensionally (press punching process). Next, lead frame 30 is wound around a prescribed reel (not shown) and subjected to prescribed plating process (plating process). The plating process is performed prior to the next step of press bending and, therefore, it is possible to perform highly efficient plating with large number of lead frames wound around the reel.

Figure 6:
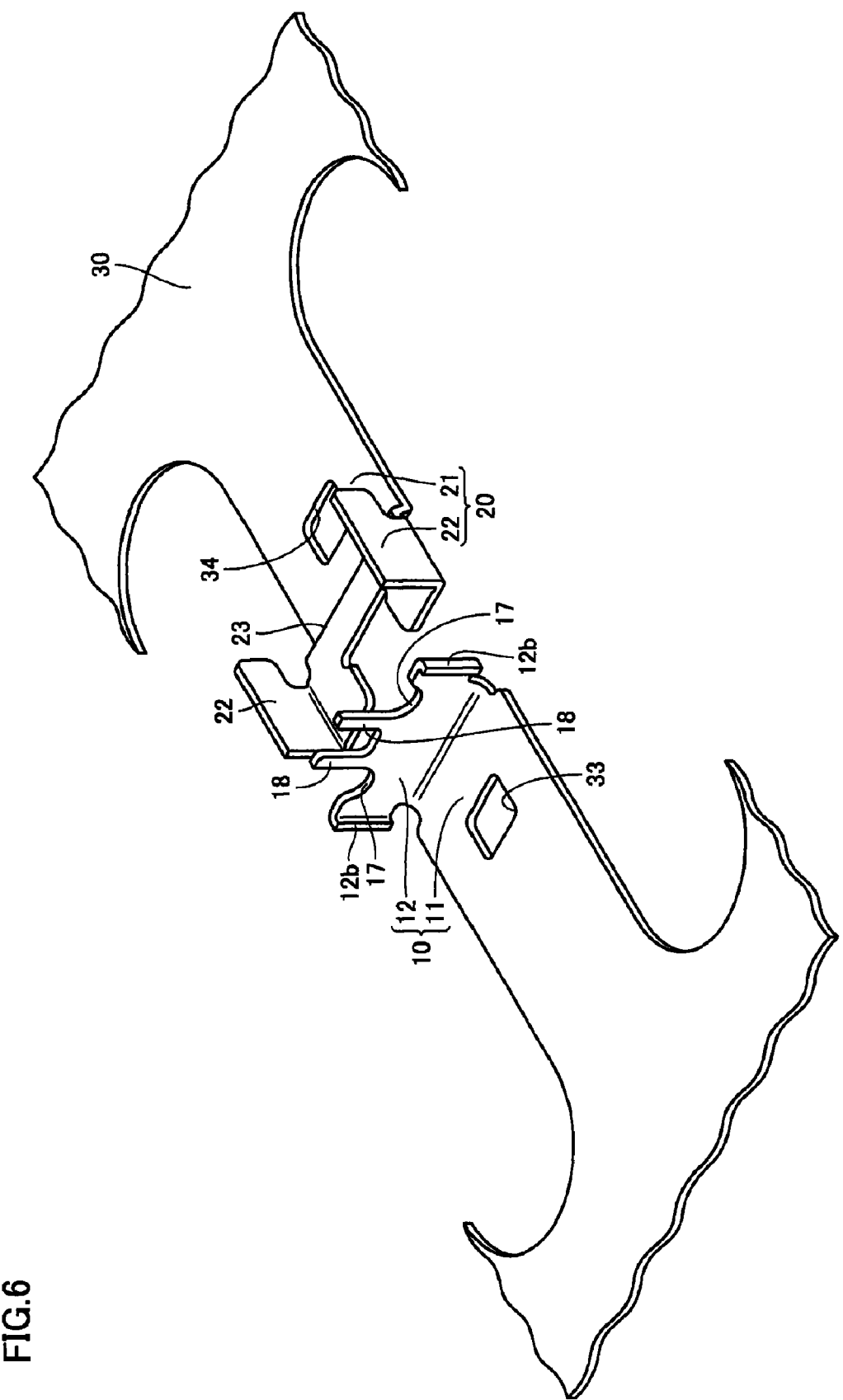
FIG. 6 is a partial perspective view showing a step following the step of FIG. 5, in accordance with the embodiment.

Next, as shown in FIG. 6, lead frame 30 is subjected to press bending (press bending process). At the portion 31 to be the anode lead frame, rising portion 12 is bent upward from anode terminal portion 11. Side end portions 12b of rising portion 12 are bent in a direction opposite to the portion 32 to be the cathode lead frame. At the portion 32 to be the cathode lead frame, step portion 23 is formed in cathode terminal portion 21, and side surface portions 22 are bent upward. Here, the recess is formed at the portion to be bent and, therefore, rising portion 12 and the like can be bent with high accuracy at a prescribed position by a prescribed angle.

Figure 7:
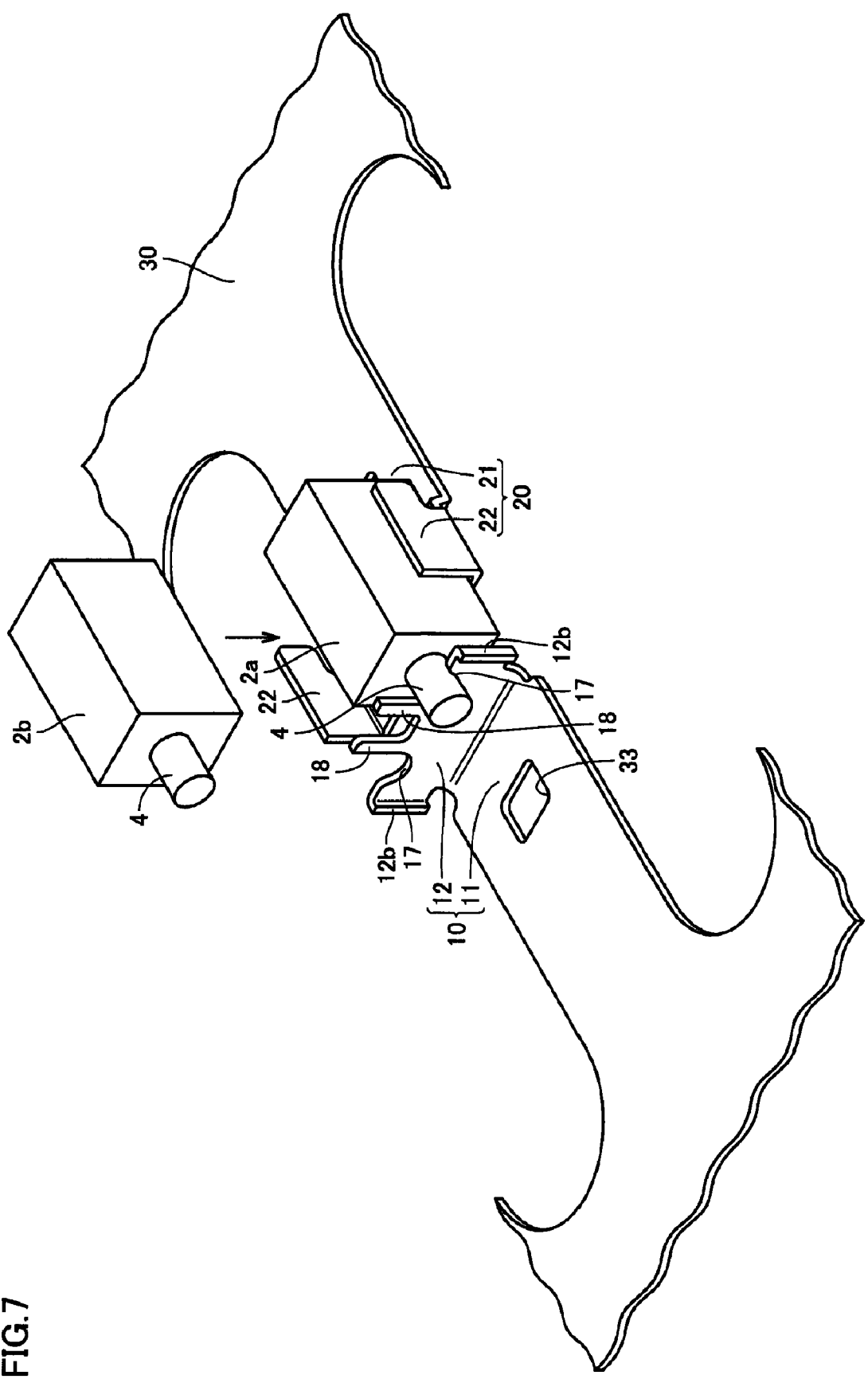
FIG. 7 is a partial perspective view showing a step following the step of FIG. 6, in accordance with the embodiment.
Figure 8:
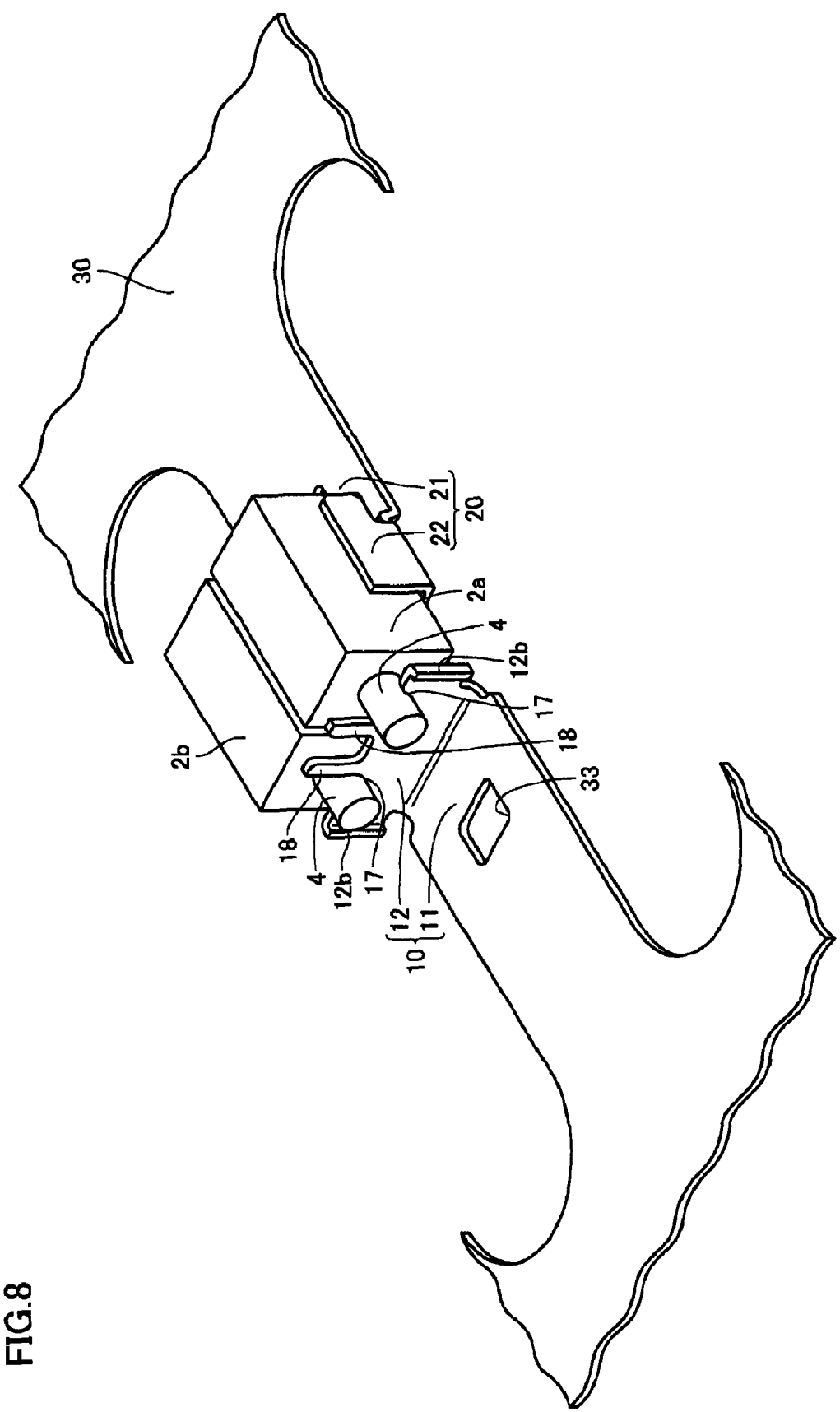
FIG. 8 is a partial perspective view showing a step following the step of FIG. 7, in accordance with the embodiment.

Next, capacitor element 2 is mounted on lead frame 30 (mounting process). As shown in FIG. 7, first, one capacitor element 2a of the two capacitor elements 2 is mounted on lead frame 30 such that its anode portion 4 is received by catching portion 17 and its cathode portion 5 is in contact with one of the pair of side surface portions 22. Next, the other capacitor element 2b is mounted on lead frame 30 such that its anode portion 4 is received by catching portion 17 and its cathode portion 5 is in contact with the other one of the pair of side surface portions 22. In this manner, two capacitor elements 2 are mounted at prescribed positions on lead frame 30. At this step, hook portions 18 protrude upward like horns, from the upper end of rising portion 12.

Figure 9:
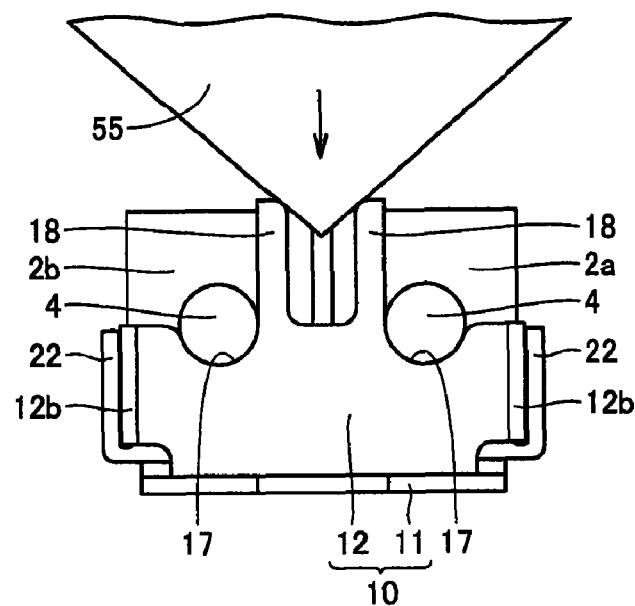
FIG. 9 is a partial front view showing a step following the step of FIG. 8, in accordance with the embodiment.
Figure 10:
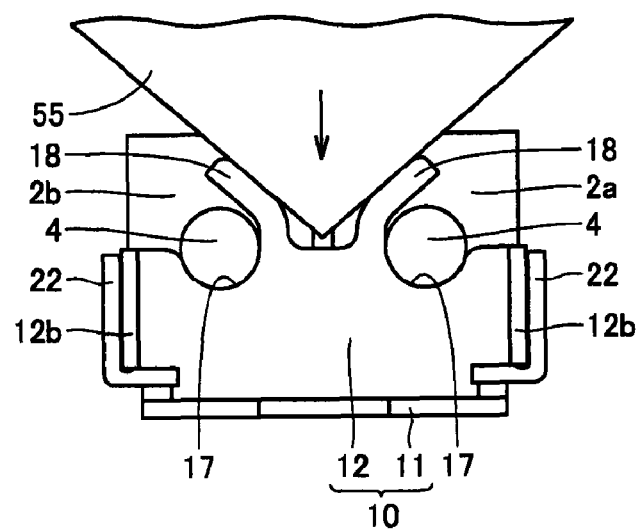
FIG. 10 is a partial perspective view showing a step following the step of FIG. 9, in accordance with the embodiment.
Figure 11:
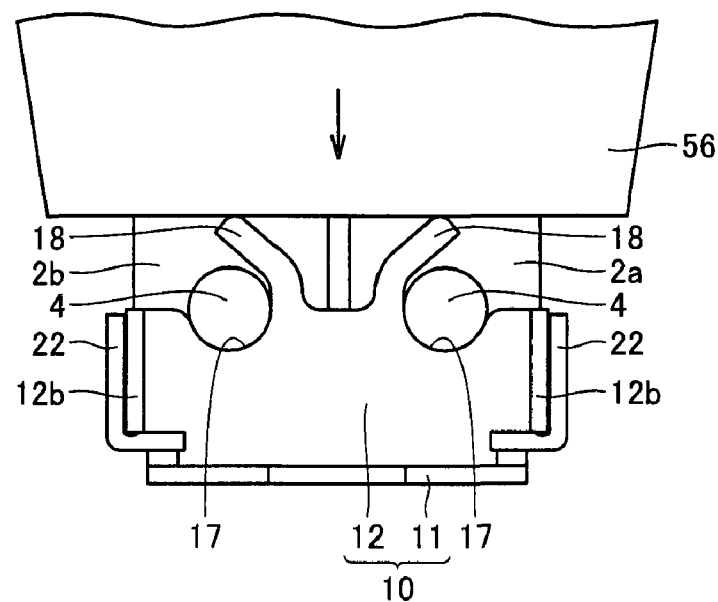
FIG. 11 is a partial perspective view showing a step following the step of FIG. 10, in accordance with the embodiment.
Figure 12:
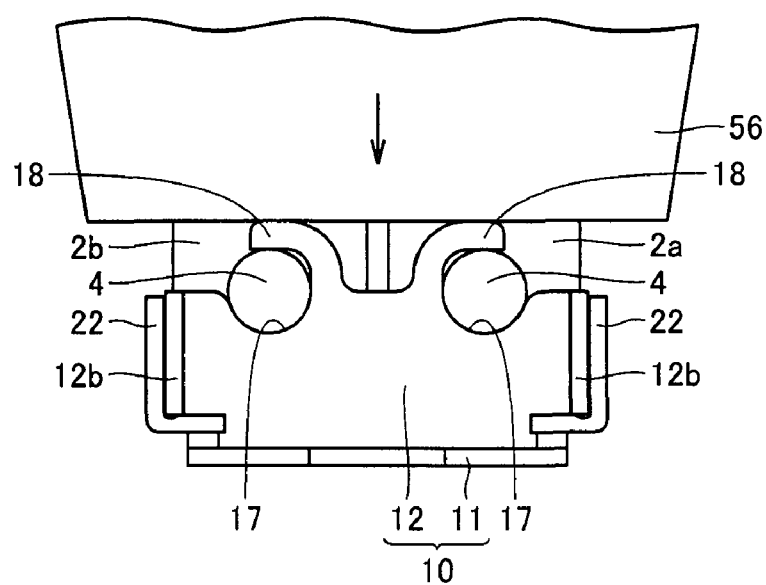
FIG. 12 is a partial perspective view showing a step following the step of FIG. 11, in accordance with the embodiment.
Figure 13:
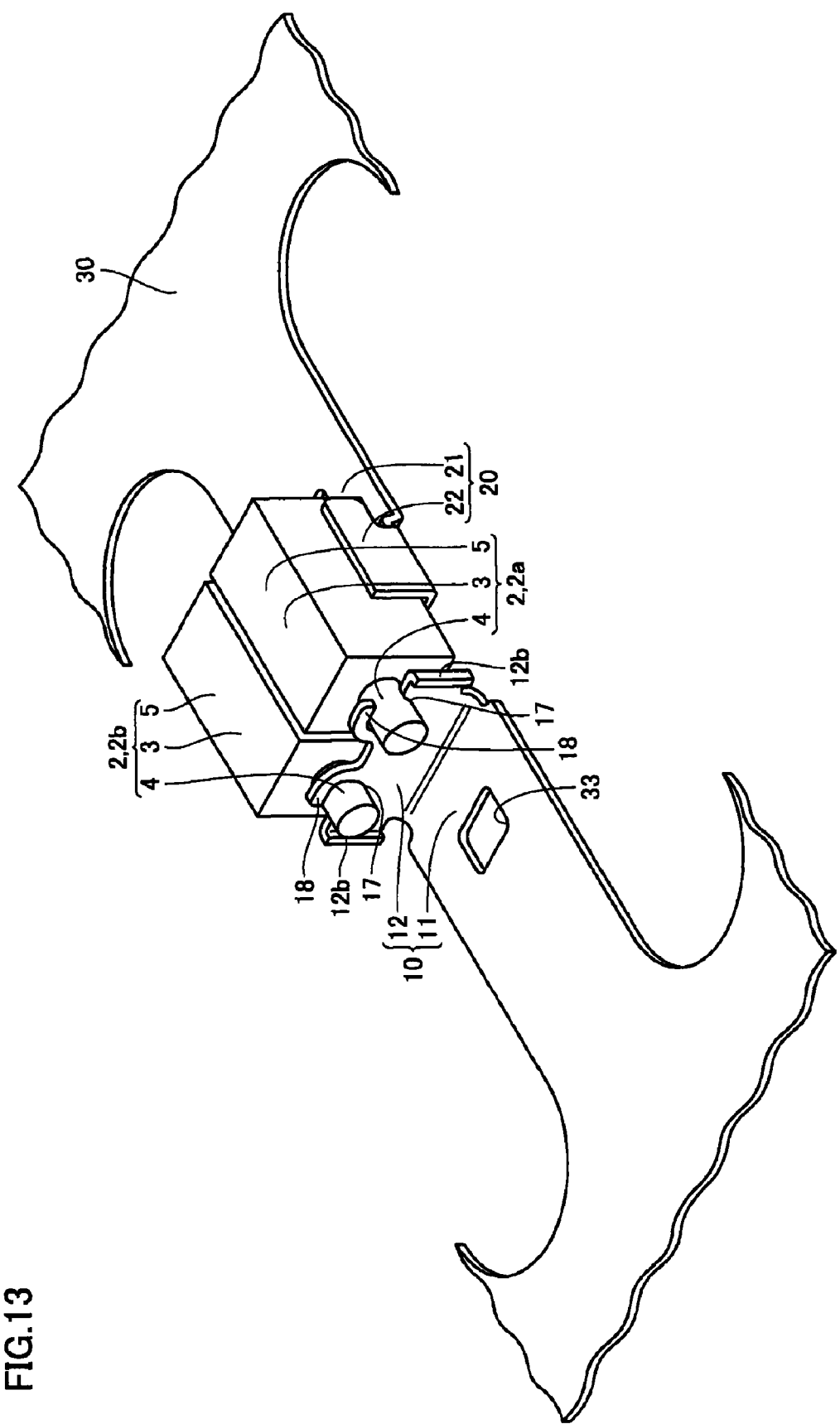
FIG. 13 is a partial perspective view of the step shown in FIG. 12, in accordance with the embodiment.

Next, the process of holding anode portions 4 of capacitor elements 2a and 2b on the lead frame is performed (holding process). As shown in FIG. 9, a jig 55 having a tip end portion of a prescribed angle is brought into contact with hook portions 18 such that the tip end portion is positioned between one and the other of the horn-like, protruded hook portions 18. Next, as shown in FIG. 10, jig 55 is moved downward and two hook portions 18 are turned with the space therebetween enlarged gradually from above. Next, as shown in FIG. 11, in place of jig 55, a trapezoidal jig 56 is brought into contact with hook portions 18. Next, as shown in FIG. 12, jig 56 is moved downward, and the two hook portions 18 are curved to surround anode portions 4. In this manner, anode portions 4 of two capacitor elements 2 are held by rising portion 12.

Figure 14:
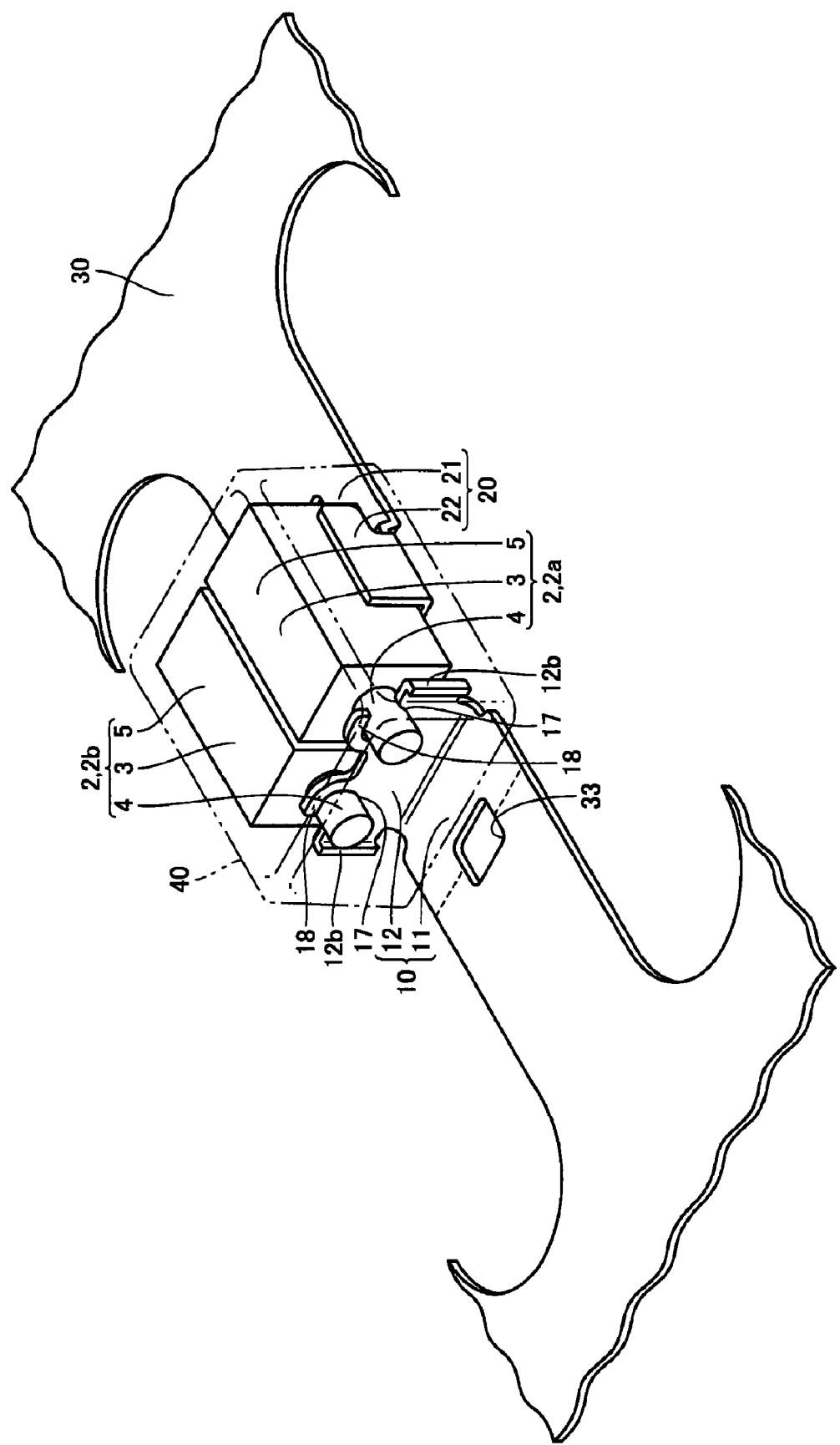
FIG. 14 is a partial perspective view showing a step following the step of FIG. 13, in accordance with the embodiment.

Thereafter, sealing with mold resin takes place (sealing process). Lead frame 30 having capacitor elements 2 held thereon is placed in a prescribed metal mold. Metal mold consists of an upper mold and a lower mold, and at least one of the upper and lower molds has a cavity to which mold resin is poured in. The cavity is filled with mold resin. Thus, capacitor elements 2 welded to lead frame 30, the portion to be the anode lead frame and the portion to be the cathode lead frame are sealed by mold resin portion 40, as shown in FIG. 14.

Next, mold resin portion 40 sealing capacitor elements 2 is cut out from lead frame 30. Here, lead frame 30 is cut at a prescribed position (see dotted line), where a part of open side wall surface 33a of fillet hole 33 formed in the portion to be the anode lead frame is left. Similarly, lead frame 30 is cut at a prescribed position (see FIG. 5 etc.), where a part of open side wall surface of fillet hole 34 formed in the portion to be the cathode lead frame is left. The plating on the left portions such as open side wall surface 33a serves to guide solder, when the solid electrolytic capacitor is mounted on a printed circuit board or the like. In this manner, the solid electrolytic capacitor 1 having capacitor elements 2 and the like sealed with mold resin portion 40 is completed.

In the solid electrolytic capacitor 1 described above, anode portion 4 of capacitor element 2 is welded to rising portion 12 formed integral with anode terminal portion 11, by the bending process of lead frame 30. Therefore, as compared with the conventional solid electrolytic capacitor having a pillow member interposed between the lead frame and the anode portion, such additional pillow member becomes unnecessary, and the process of welding the pillow member to the lead frame becomes unnecessary, so that manufacturing cost can be reduced.

Figure 15:
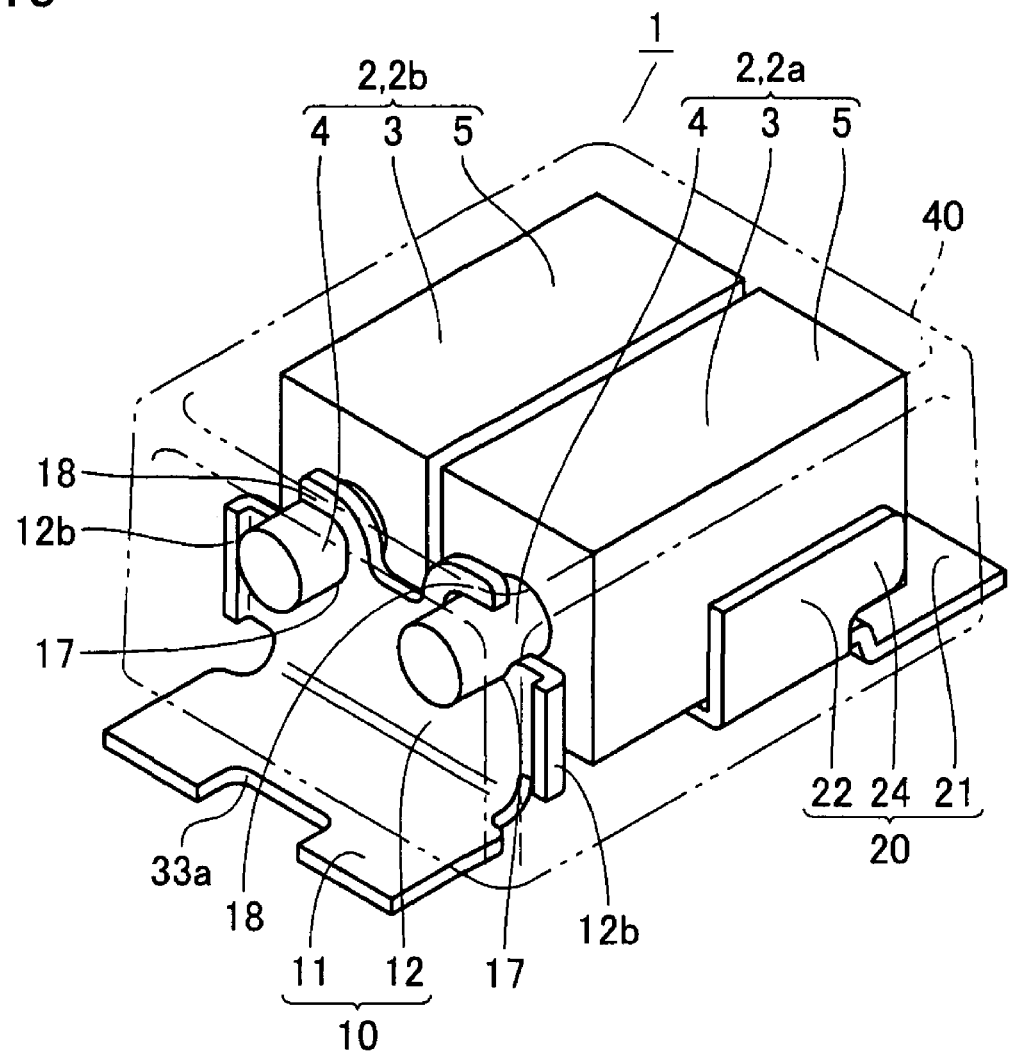
FIG. 15 is a partial perspective view showing a step following the step of FIG. 14, in accordance with the embodiment.

Further, as shown in FIG. 15, at rising portion 12, catching portions 17 and hook portions 18 are formed. In the holding process (see FIGS. 9 to 12), using prescribed jigs 55 and 56, the pair of hook portions 18 are curved with the space therebetween increased gradually from above such that one hook portion 18 surrounds anode portion 4a of capacitor element 2a and the other hook portion 18 surrounds the anode portion of capacitor element 2b, whereby anode portions can be held by hook portions 18. Therefore, different from attachment of anode portion 4 to anode lead frame 10 by welding, anode lead frame is free from thermal distortion caused by welding.

Figure 16:
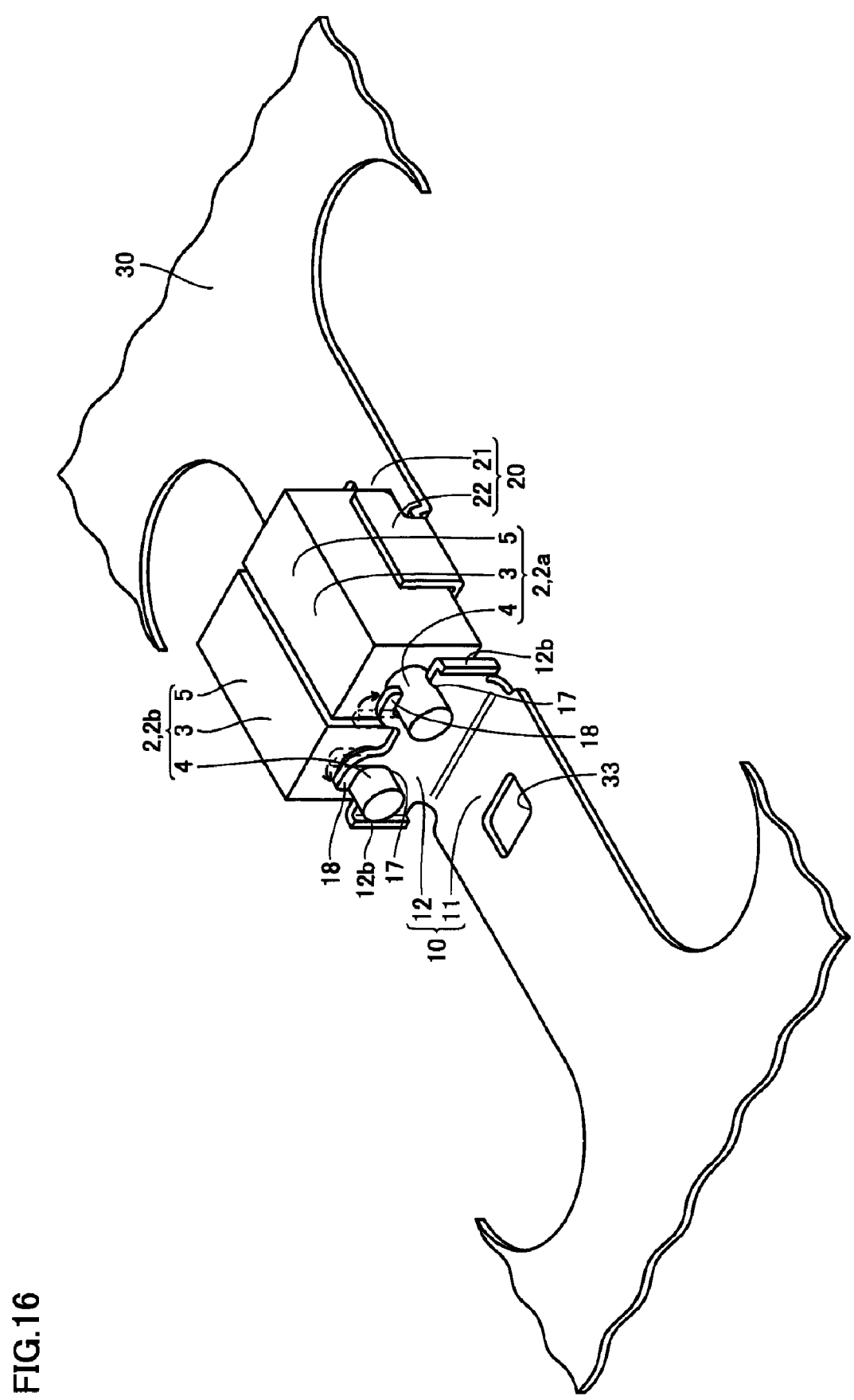
FIG. 16 is a partial perspective view illustrating the function and effect of the rising portion in accordance with the embodiment.

Further, as shown in FIG. 16, hook portions 18 are curved to surround the outer circumferential surfaces of anode portions 5, sufficient contact area (plane contact) between anode portion 4 and anode lead frame 10 can be ensured. Further, when a space between anode lead frame 10 and anode portion 4 is filled using conductive paste (not shown), the contact area can further be increased. As a result, equivalent series resistance (ESR) as the resistance component of capacitor element 2 can be reduced. It is noted that thermal processing at a temperature of about 100° C. to about 200° C. is necessary for applying the conductive paste. The thermal distortion involved in this thermal processing, however, is negligible as compared with the thermal distortion caused by welding.

Anode portion 4 comes to be held by hook portion 18, with anode portion 4 of capacitor element 2 received in catching portion 17. Thus, it becomes possible to hold capacitor element 2 at a prescribed position of lead frame 30 with high accuracy.

Further, at rising portion 12, side end portions 12b are bent in a direction away from cathode portion 5 of capacitor element 2. This reliably prevents deformation or fall of rising portion 12 because of pressing force, when prescribed jigs 55 and 56 are used to curve the pair of hook portions 18. Further, as the side end portions 12b are bent, adhesion with mold resin portion 40 can be improved.

Figure 17:
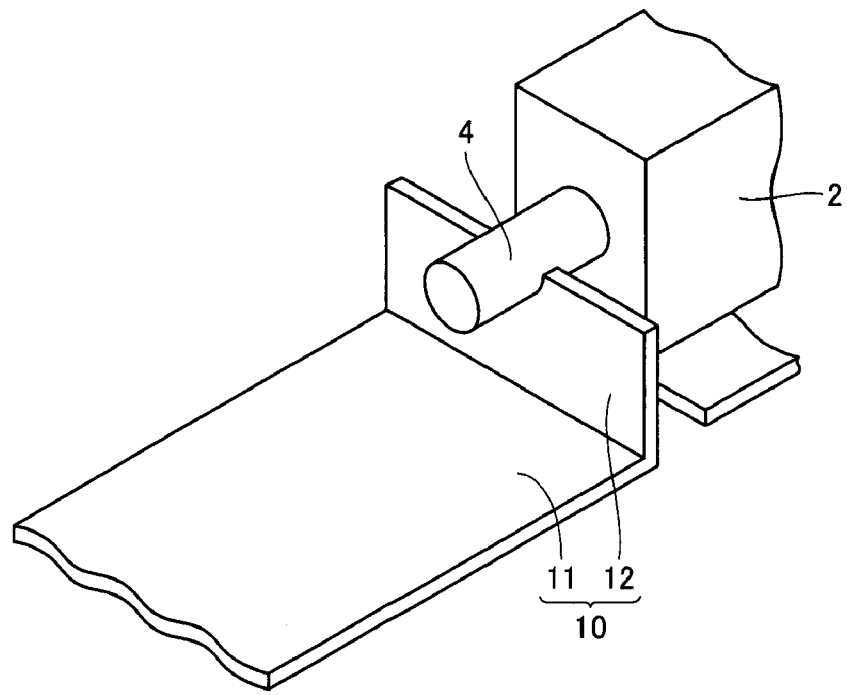
FIG. 17 is a partial perspective view schematically showing the rising portion, illustrating the function and effect of the rising portion in accordance with the embodiment.
Figure 18:
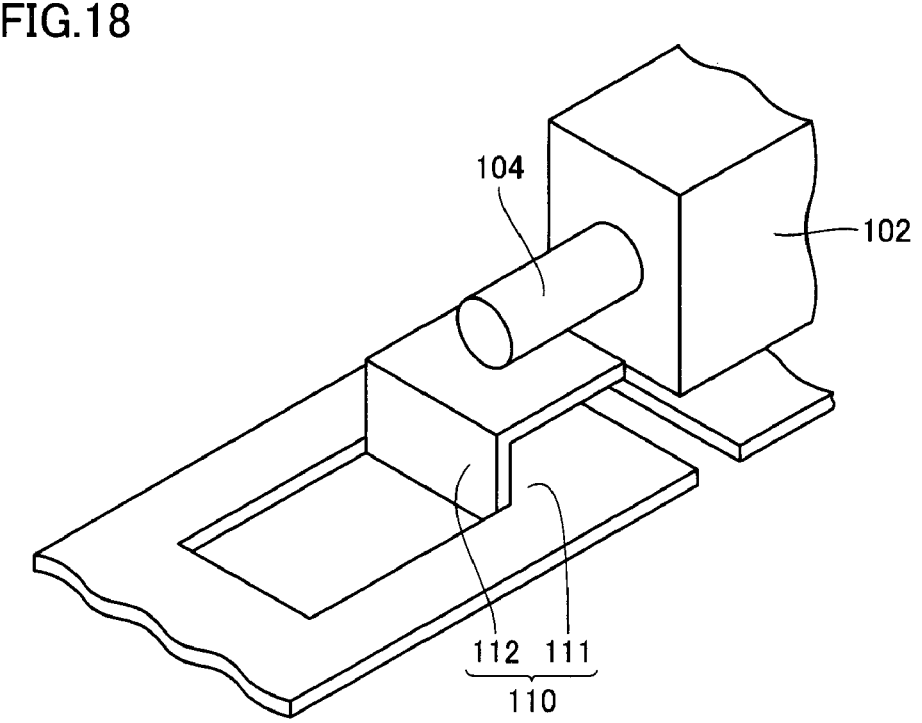
FIG. 18 is a partial perspective view schematically showing the rising portion in accordance with a comparative example.
Figure 19:
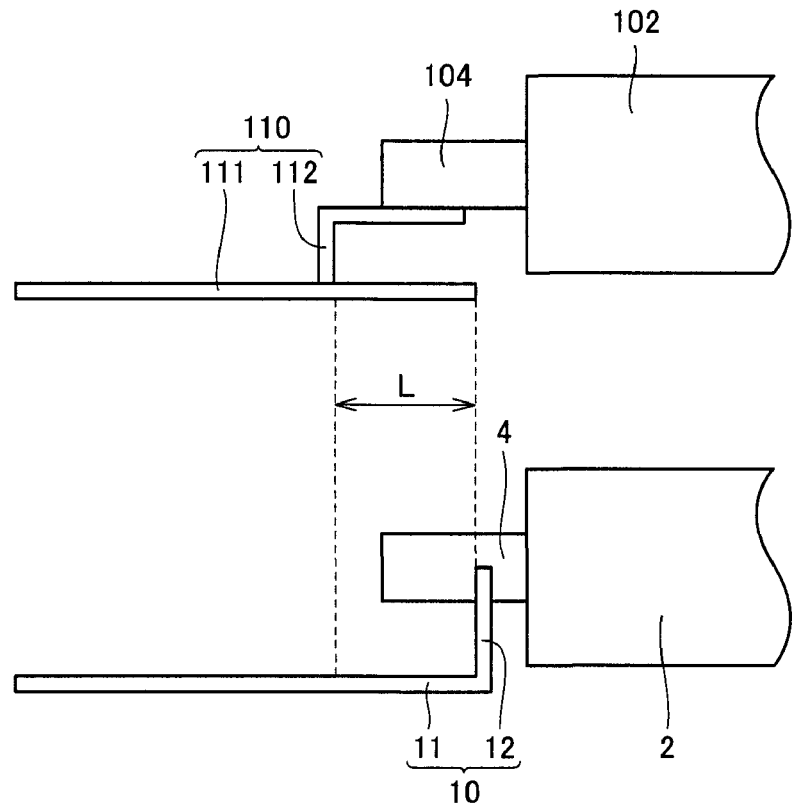
FIG. 19 is a partial side view illustrating the function and effect of the rising portion in accordance with the embodiment.

Further, as shown in FIG. 17, rising portion 12 is formed to extend from an end closer to the cathode portion 5 of capacitor element 2 of anode terminal portion 11 to the anode portion 4 of capacitor element 2. Therefore, as compared with a comparative example shown in FIG. 18 in which a rising portion 112 is formed by cutting and raising part of an anode terminal portion 111 to be in contact with an anode portion 104, the position where rising portion 12 is raised from anode terminal portion 11 can be made closer by a distance L to the capacitor element 2. As a result, resistance between anode portion 4 and anode terminal 11 can be reduced. Further, capacitor element can be made larger by the distance L and, hence, volumetric efficiency can be improved.

Further, as shown, for example, in FIG. 4, cathode lead frame 20 of solid electrolytic capacitor 1 has a pair of side surface portions 22 opposite to each other. Therefore, when capacitor element 2 is mounted on lead frame 30, what is necessary is simply to place capacitor element 2 in an area between one side surface portion 22 and the other side surface portion 22. Thus, positioning of capacitor element 2 with respect to lead frame 30 becomes easier.

Further, side surface portion 22 has extended portion 24, so that contact area between the cathode portion 5 of capacitor element 2 and cathode lead frame 20 can be increased. This leads to reduction of ESR of capacitor element 2.

Figure 20:
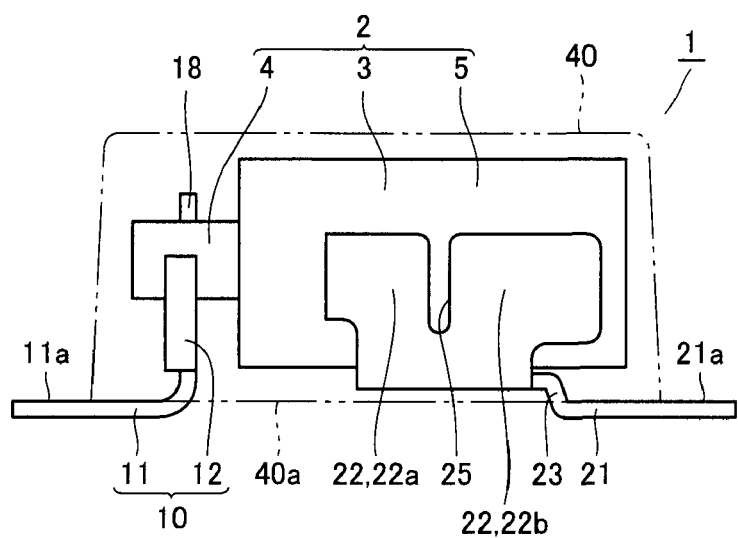
FIG. 20 is a side view showing a modification of a side surface portion of the cathode lead frame in accordance with the embodiment.
Figure 21:
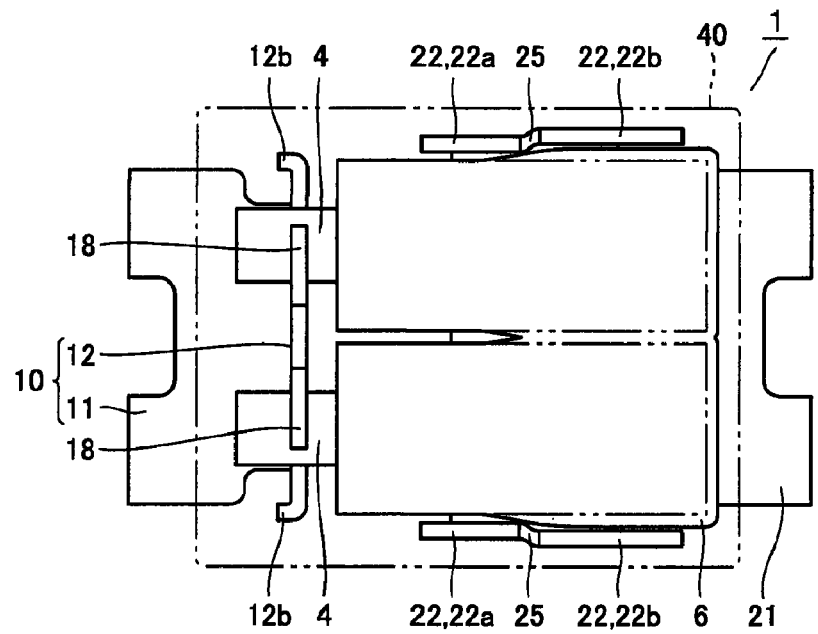
FIG. 21 is a top view showing the solid electrolytic capacitor shown in FIG. 20 in accordance with the embodiment.

Further, as shown in FIG. 20, side surface portion 22 may be divided into side surface portions 22a and 22b by forming a slit 25. This ensures contact of side surface portion 22 to cathode portion 5. Cathode portion 5 is dipped in silver paste and lifted and, therefore it is coated with silver paste. As a result, sometimes a pool 6 of silver paste forms on cathode portion 5. At this time, as shown in FIG. 21, when side surface portion 22 is divided into side surface portions 22a and 22b, it becomes possible to bring side surface portion 22b into contact with a portion with silver paste pool 6 and to bring side surface portion 22a into contact with a portion without silver paste pool 6. Therefore, as compared with the side surface portion without any slit, contact area is ensured between side surface portion 22 and cathode portion 5.

Further, in solid electrolytic capacitor 1 described above, bottom surface 40a of mold resin portion 40 is in direct contact with upper surface 11a of anode terminal portion 11 and upper surface 21a of cathode terminal portion 21. Specifically, bottom surface 40a and upper surfaces 11a and 21a are positioned substantially on the same plane. Therefore, it becomes possible to ensure larger capacity of the cavity, by placing an end portion of metal mold cavity closer to the fillet hole. This will be described with respect to a solid electrolytic capacitor of a comparative example.

Figure 22:
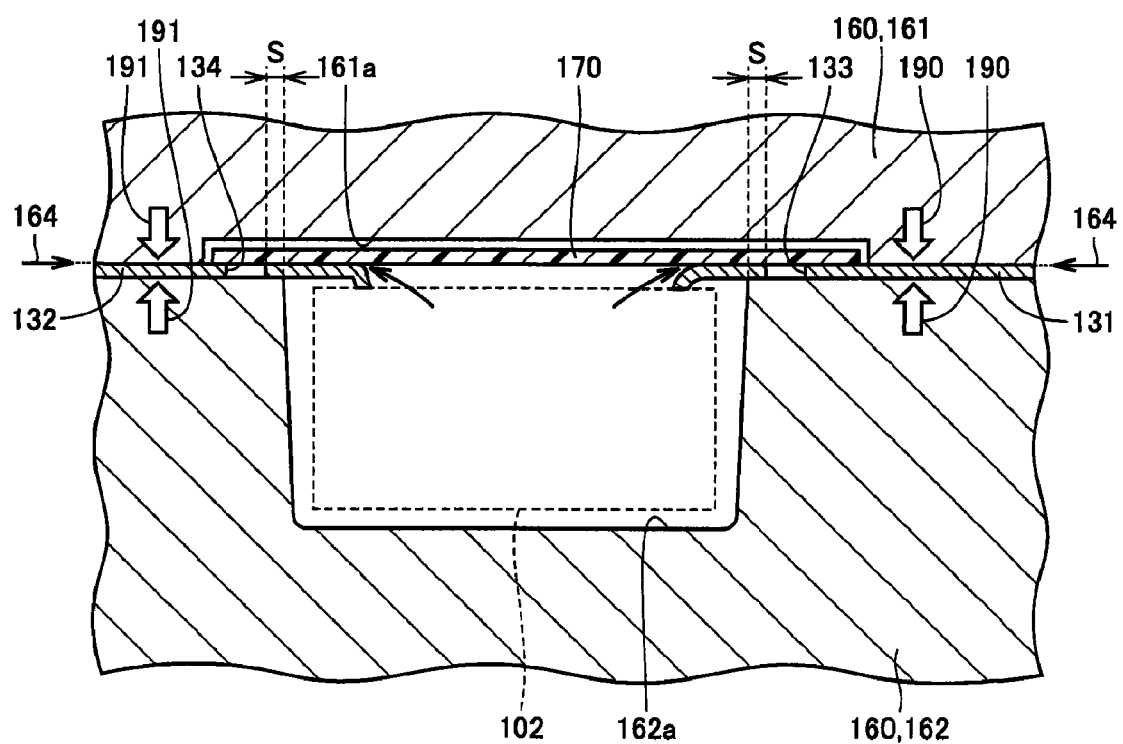
FIG. 22 is a partial sectional view showing the step of sealing the solid electrolytic capacitor with mold resin, in accordance with a comparative example.

First, in the solid electrolytic capacitor in accordance with the comparative example, the bottom surface of mold resin portion is formed to be at an approximately the same position as the lower surface of anode terminal portion and the lower surface of cathode terminal portion. As shown in FIG. 22, at the step of filling mold resin, in order to prevent mold resin from leaking to the surfaces of the portion 131 to be the anode lead frame and the portion 132 to be the cathode lead frame, an insulating tape 170 formed, for example, of polyimide is adhered to the surface of the lead frame. Further, the insulating film is adhered to close fillet holes 133 and 134 formed in lead frame 130. To prevent mold resin from flowing between insulating tape 170 and lead frame 130 and further leaking to fillet holes 133 and 134 because of mold resin introducing pressure, an end portion of a cavity 162a is separated by a prescribed distance S from fillet holes 133 and 134.

An upper metal mold 161 has a recess 161a formed in consideration of the thickness of insulating tape 170. Fastening forces (arrows 190, 191) are applied to the upper and lower metal molds 161 and 162 at portions other than where the insulating tape 170 is adhered, and mold resin is poured into cavity 162a formed in lower metal mold 162, so that capacitor element and the like are sealed. It is noted that an arrow 164 indicates a position of splitting surface (joint surface) of upper and lower metal molds 161 and 162.

Figure 23:
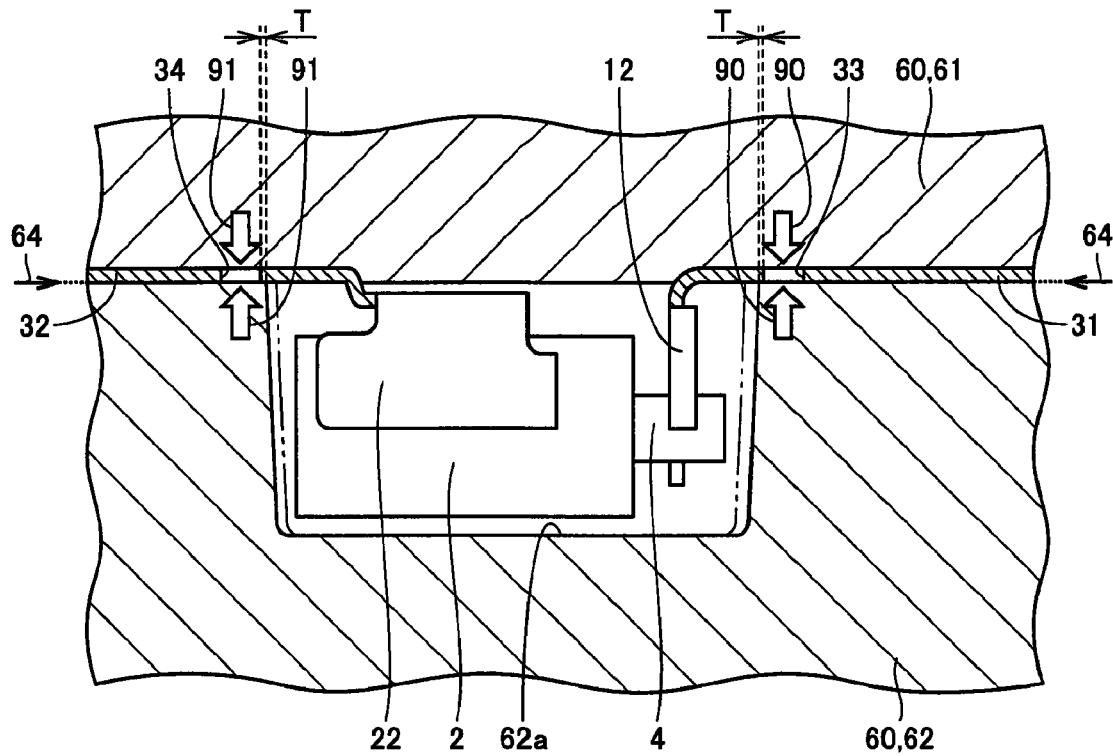
FIG. 23 is a partial sectional view showing the step of sealing the solid electrolytic capacitor with mold resin, in accordance with the embodiment.

In contrast, in solid electrolytic capacitor described above, the bottom surface of mold resin portion is formed to be substantially at the same position as the upper surface of anode terminal portion and the upper surface of cathode terminal portion. As shown in FIG. 23, at the step of filling mold resin, it is unnecessary to adhere an insulating tape to the lead frame. Therefore, it is possible to apply the fastening forces (arrows 90, 91) to upper metal mold 61 and lower metal mold 62 at positions very close to cavity 62a. Specifically, the distance between the end portion of cavity 62a and fillet holes 33, 34 can be made shorter from S to T. Further, the distance of protrusion of lead frame (anode terminal portion 11, cathode terminal portion 12) from mold resin portion 40 becomes shorter and, therefore, possible defects caused by being caught, for example, during packing or shipment can be reduced. It is noted that an arrow 64 indicates a position of splitting surface (joint surface) of upper and lower metal molds 61 and 62.

In this manner, in the solid electrolytic capacitor described above, upper metal mold 61 and lower metal mold 62 can be fastened at close vicinity of cavity 62a and, therefore, cavity 62a can be placed very close to fillet holes 33 and 34. Therefore, with fillet holes 33 and 34 being at the same position, larger capacity of the cavity can be ensured and, therefore, a larger capacitor element can be mounted as the capacitor element to be sealed in mold resin portion 40. Further, the distance of protrusion of anode terminal portion 11 and cathode terminal portion 12 from mold resin portion 40 becomes shorter and, therefore, possible defects caused by being caught, for example, during packing or shipment can be reduced. It is noted that two-dotted lines represent the ends of lower mold cavity of the comparative example.

Further, the lead frame is pinched between the upper and lower metal molds 61 and 62 with the upper metal mold being in direct contact with the (rear surface of) lead frame and, therefore, flowing of mold resin to the rear surfaces of anode terminal portion 11 and cathode terminal portion 12 can reliably be prevented.

Modification of Anode Lead Frame

Figure 2:
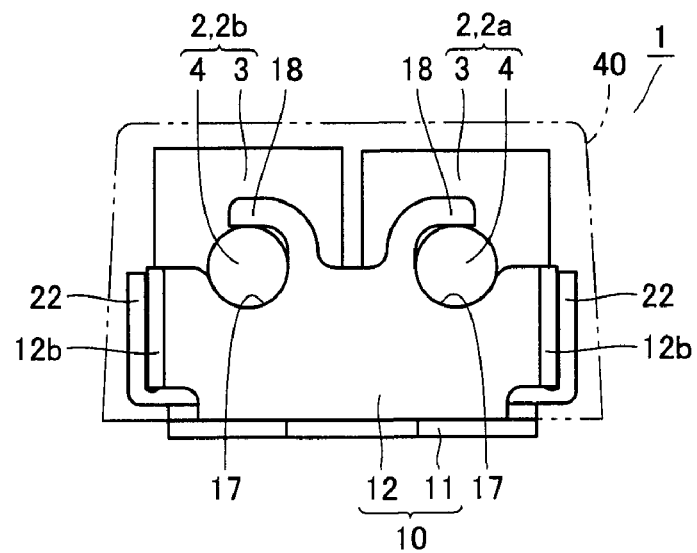
FIG. 2 is a front view of the solid electrolytic capacitor shown in FIG. 1, in accordance with the embodiment.
Figure 3:
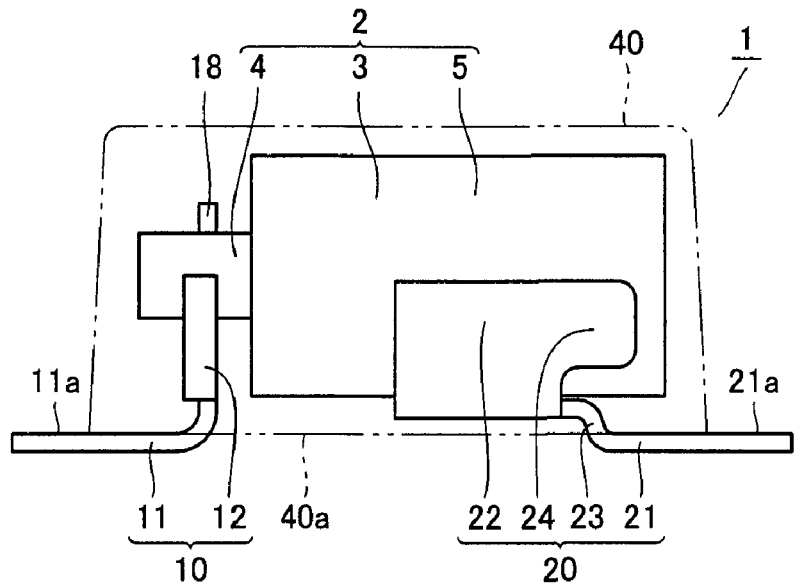
FIG. 3 is a side view of the solid electrolytic capacitor shown in FIG. 1, in accordance with the embodiment.
Figure 24:
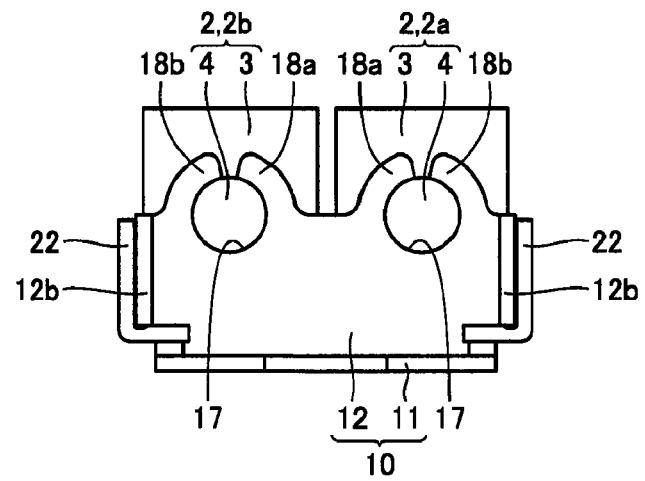
FIG. 24 is a front view showing a first modification of the anode lead frame in accordance with the embodiment.
Figure 25:
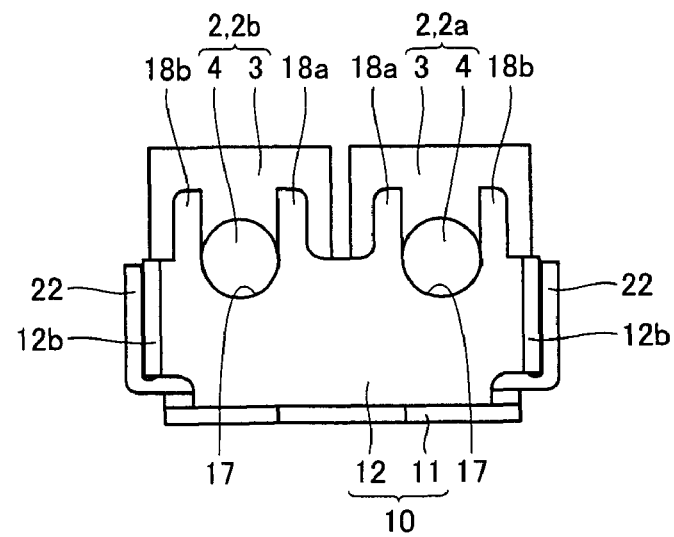
FIG. 25 is a front view showing a state before curving the hook portion of the anode lead frame shown in FIG. 24, in accordance with the embodiment.

As the hook portion 18 formed at rising portion 12 of anode lead frame of solid electrolytic capacitor 1, other than the hook portions 18 shown in FIG. 2, two hook portions 18a, 18b may be provided for one anode portion 4, as shown in FIG. 24. In this example, horn-like hook portions 18a, 18b protruded at the upper end of rising portion 12 are curved both toward the anode portion 4, so that anode portion 4 is held. Here, as the two hook portions 18a and 18b are in contact with anode portion 4, ESR can further be reduced.

Figure 26:
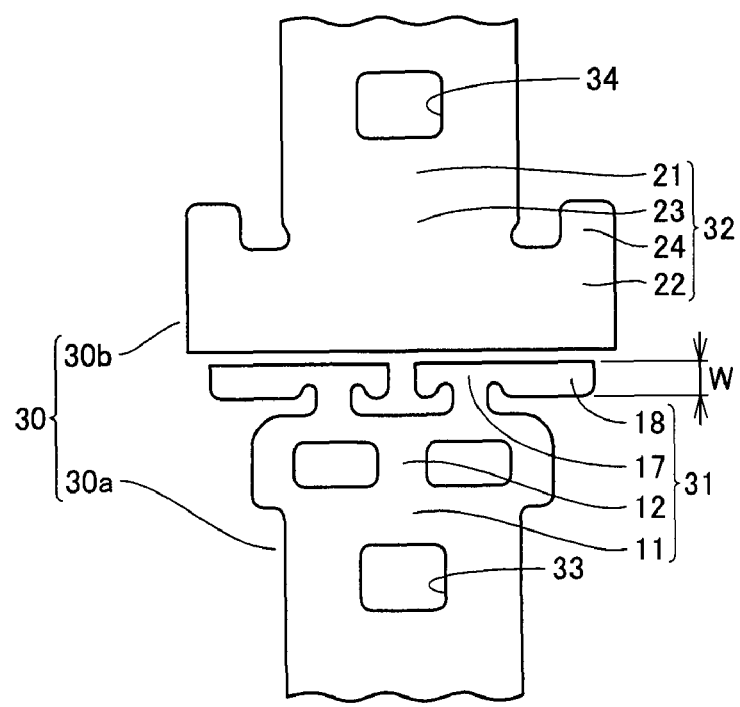
FIG. 26 is a partial plan view showing a lead frame applied to the second modification of the anode lead frame, in accordance with the embodiment.
Figure 27:
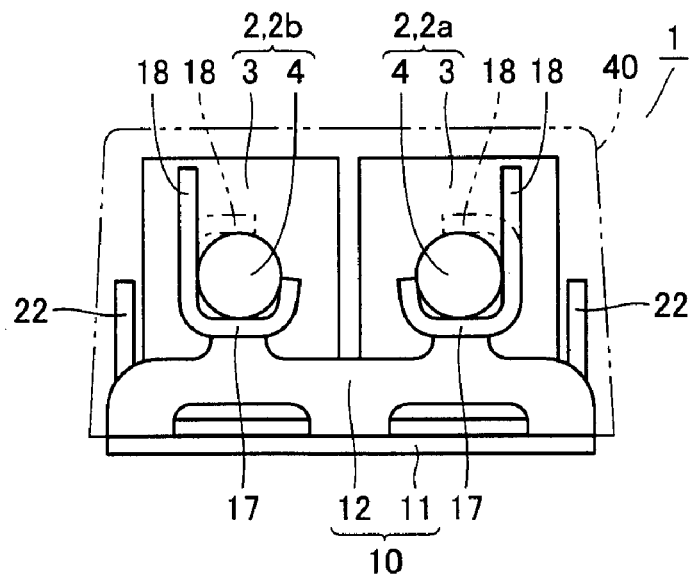
FIG. 27 is a front view showing the solid electrolytic capacitor to which the lead frame shown in FIG. 26 is applied, in accordance with the embodiment.
Figure 28:
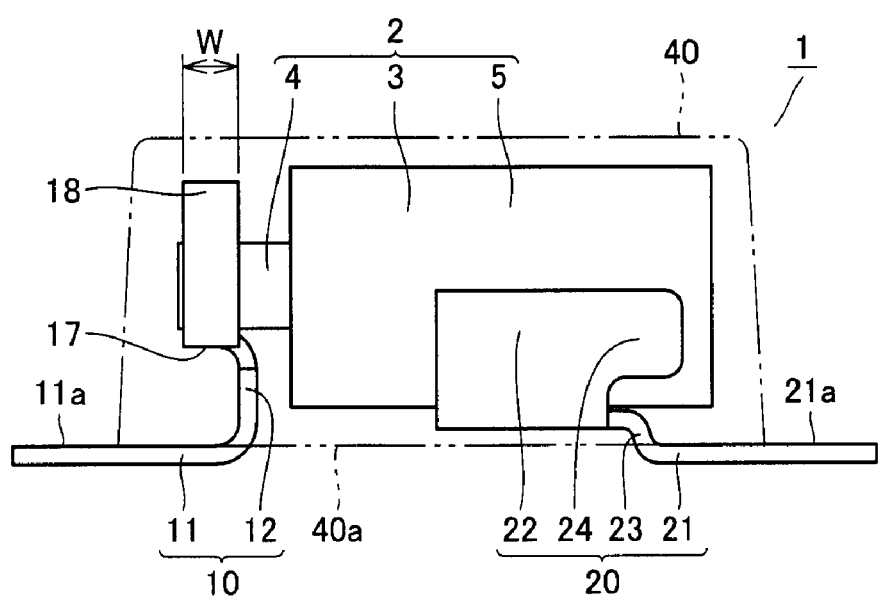
FIG. 28 is a side view showing the solid electrolytic capacitor to which the lead frame shown in FIG. 26 is applied, in accordance with the embodiment.

In connection with hook portion 18 of solid electrolytic capacitor 1 described above, a portion as a punched out sectional surface of hook portion 18 is in contact with anode portion 4 of capacitor element 2. Other than this structure, the hook portion may be formed such that a portion having a prescribed width is brought into contact with the anode portion. In that case, as the lead frame, a lead frame 30 having hook portions 18 of a prescribed width W developed two-dimensionally at the portion 31 to be the anode lead frame, as shown in FIG. 26, is applied. In the holding process, the hook portion 18 having the width W is wound around anode portion 4 of capacitor element 2, whereby capacitor element 2 is held on anode lead frame. As shown in FIGS. 27 and 28, in solid electrolytic capacitor 1, anode portion 4 is held by hook portion 18 having the width W and, therefore, line contact of the length corresponding to the width W can be realized at a plurality of portions between anode portion 4 and hook portion 18. Therefore, sufficient contact area between hook portion 18 and anode portion 4 is ensured, which contributes to reduction in ESR.

Figure 29:
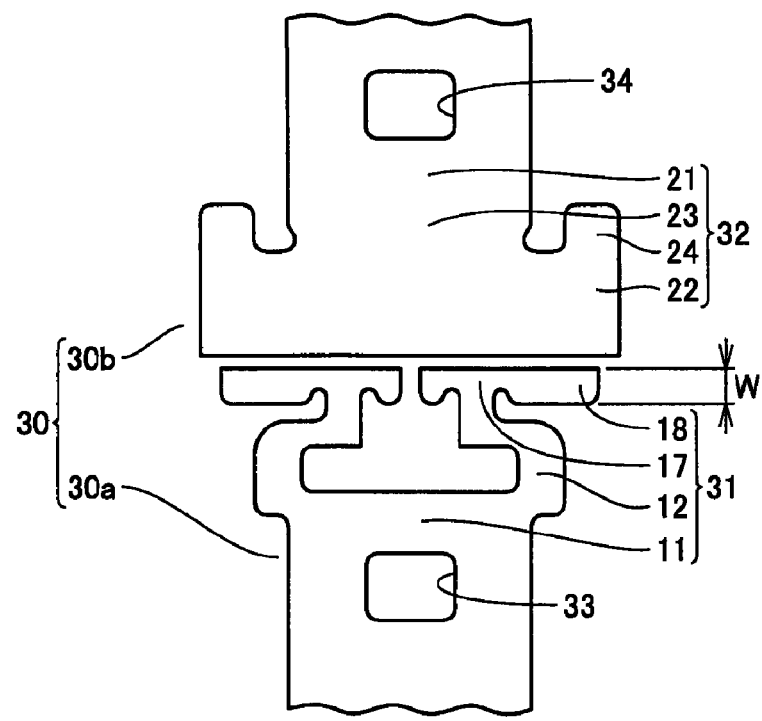
FIG. 29 is a partial plan view showing the lead frame applied to the third modification of the anode lead frame, in accordance with the embodiment.
Figure 30:
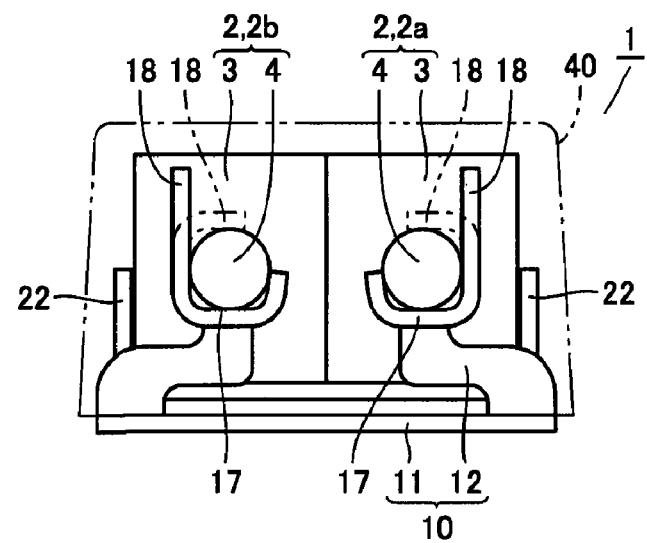
FIG. 30 is a front view showing the solid electrolytic capacitor to which the lead frame shown in FIG. 29 is applied, in accordance with the embodiment.
Figure 31:
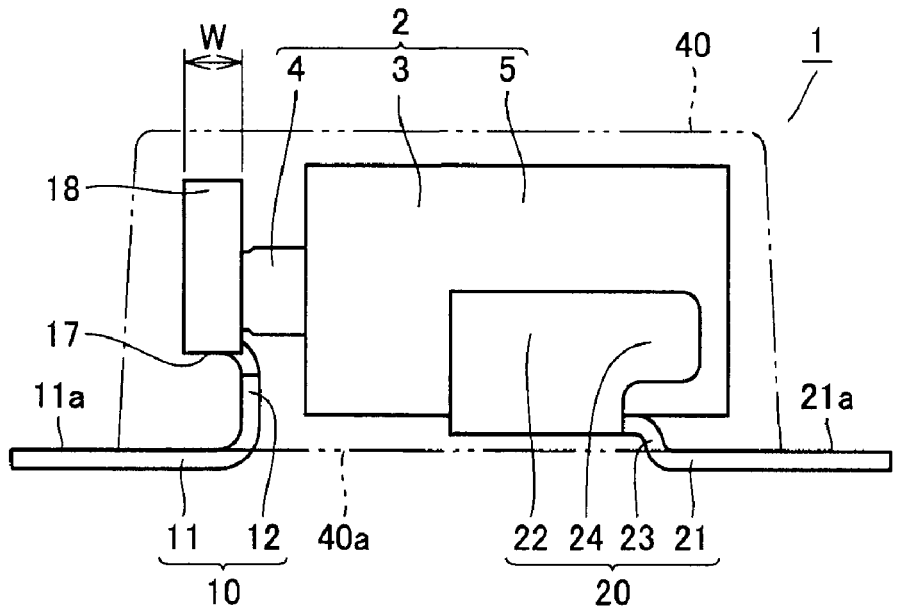
FIG. 31 is a side view showing the solid electrolytic capacitor to which the lead frame shown in FIG. 29 is applied, in accordance with the embodiment.

Further, as the lead frame, a lead frame 30 having a large cut-out pattern formed in rising portion 12 as shown in FIG. 29 may be used, other than the lead frame 30 shown in FIG. 26. As shown in FIGS. 30 and 31, in solid electrolytic capacitor 1 to which such a lead frame is applied, line contact of the length corresponding to the width W can be realized at a plurality of portions between anode portion 4 and hook portion 18, reducing ESR.

Figure 32:
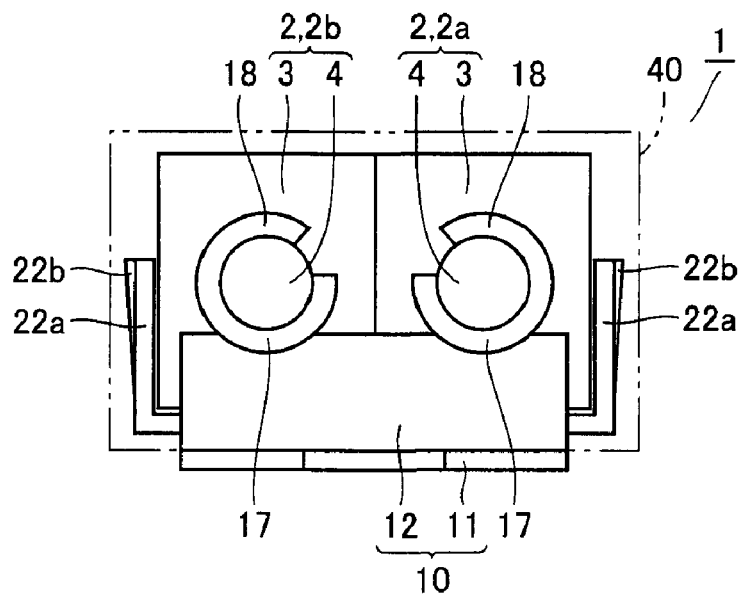
FIG. 32 is a plan view showing the solid electrolytic capacitor to which a fourth modification of the anode lead frame is applied, in accordance with the embodiment.
Figure 33:
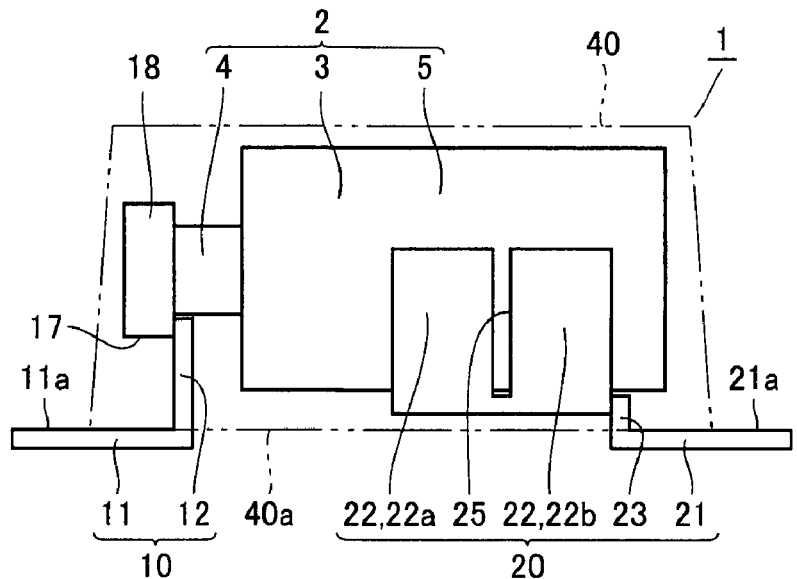
FIG. 33 is a side view of the solid electrolytic capacitor of FIG. 32, in accordance with the embodiment.
Figure 34:
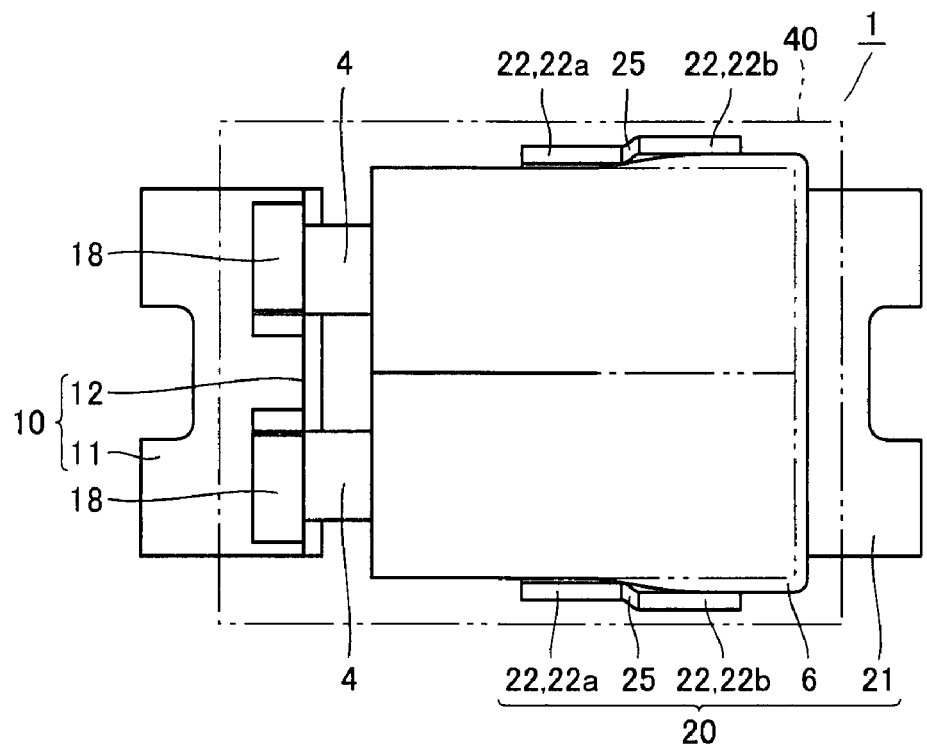
FIG. 34 is a top view of the solid electrolytic capacitor of FIG. 32, in accordance with the embodiment.
Figure 35:
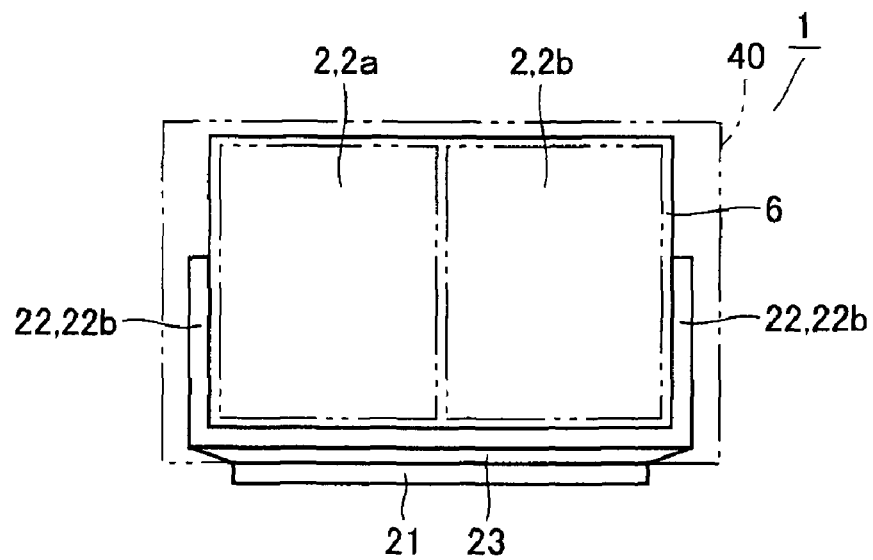
FIG. 35 is a rear view of the solid electrolytic capacitor of FIG. 32, in accordance with the embodiment.
Figure 36:
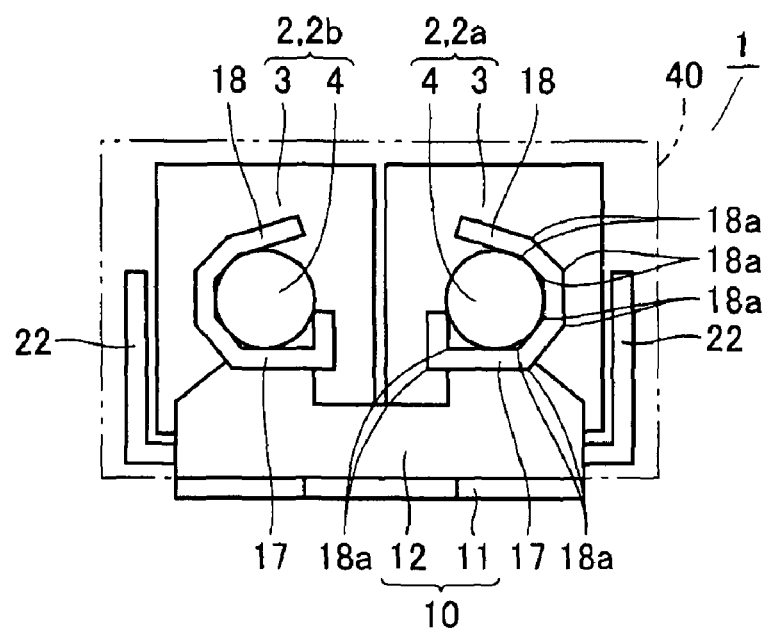
FIG. 36 is a front view showing the solid electrolytic capacitor to which a fifth modification of the anode lead frame is applied, in accordance with the embodiment.
Figure 37:
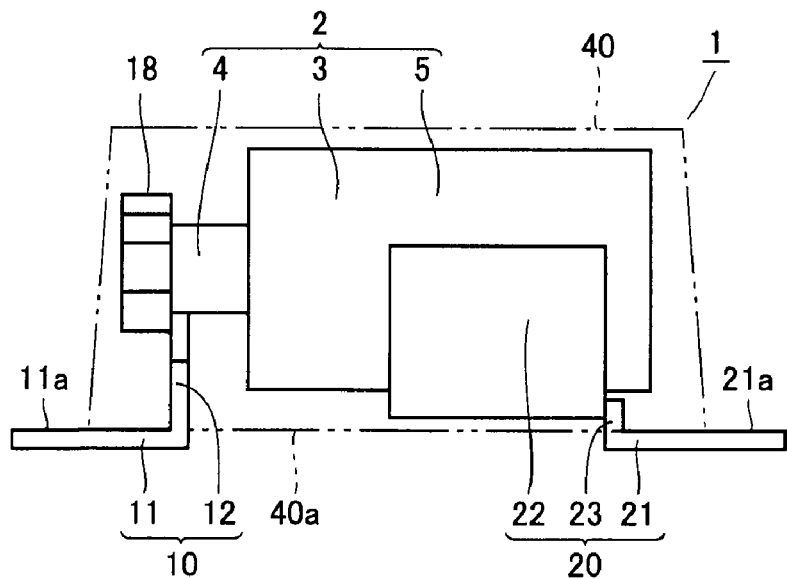
FIG. 37 is a side view showing the solid electrolytic capacitor of FIG. 36, in accordance with the embodiment.
Figure 38:
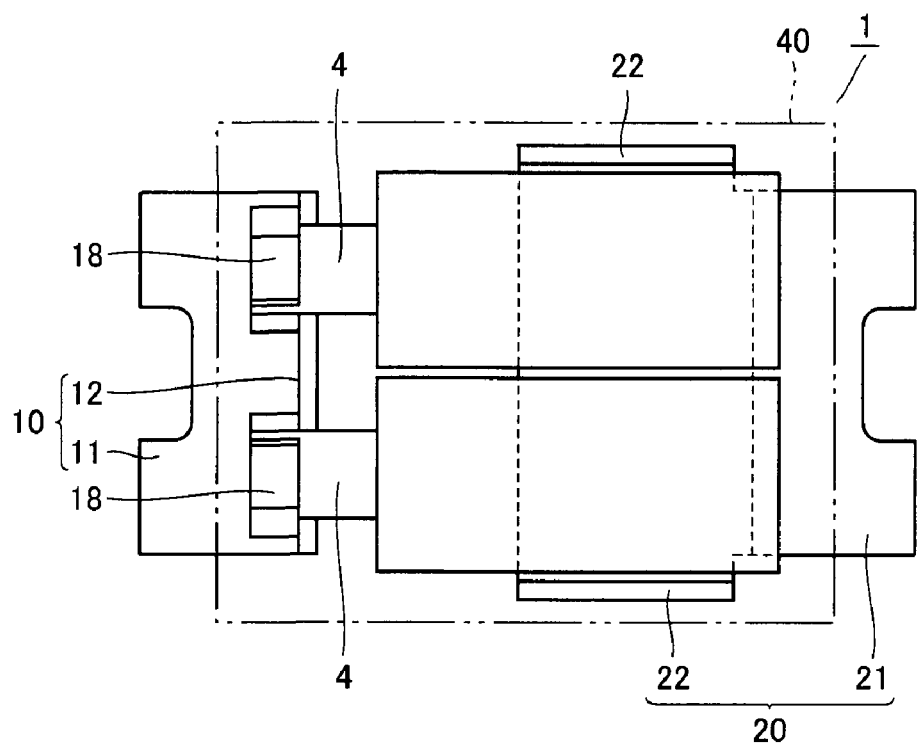
FIG. 38 is a top view showing the solid electrolytic capacitor of FIG. 37, in accordance with the embodiment.

Further, in connection with the hook portion of solid electrolytic capacitor 1, other than the hook portion having a portion of prescribed width in line contact with the anode portion, a hook portion may be adopted in which the portion of the prescribed width is in plane contact with the anode portion. In that case, hook portion 18 is in plane contact with anode portion 4 as shown in FIGS. 32, 33 and 34 and, therefore, ESR can further be reduced. Further, side surface portion 22 may be divided into side surface portions 22a and 22b by forming a slit 25 as shown in FIGS. 33, 34 and 35. Then, it becomes possible to bring side surface portion 22b into contact with a portion with silver paste pool 6 and to bring side surface portion 22a into contact with a portion without silver paste pool 6. Therefore, as compared with the side surface portion without any slit, contact area is ensured between side surface portion 22 and cathode portion 5.

Further, in the hook portion having a portion of prescribed width in contact with the anode portion, a plurality of folding lines may be formed in the width direction of the portion having the prescribed width. In that case, the portion having the prescribed width can be folded easily along the folding lines 18a, and hook portion 18 can reliably be brought into contact (line contact) with the anode portion 4. By increasing the number of folding lines 18a, it becomes possible to increase the portions of line contact between the portion having the prescribed width and the anode portion, which contributes to reduction of ESR.

Variation of Number of Capacitor Elements

Figure 39:
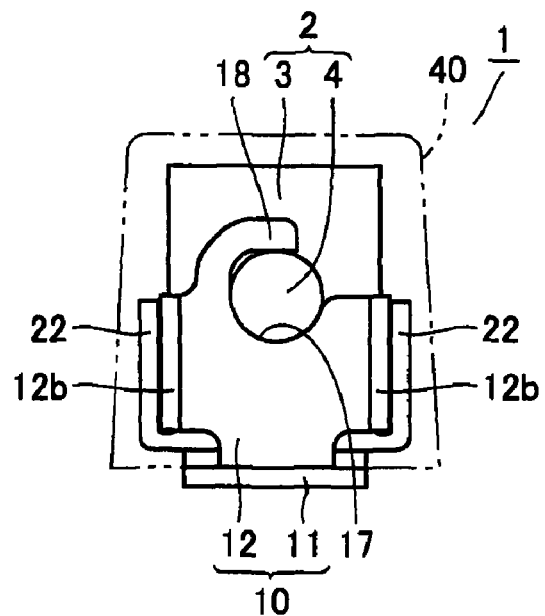
FIG. 39 is a front view showing the solid electrolytic capacitor when one capacitor element is mounted.
Figure 40:
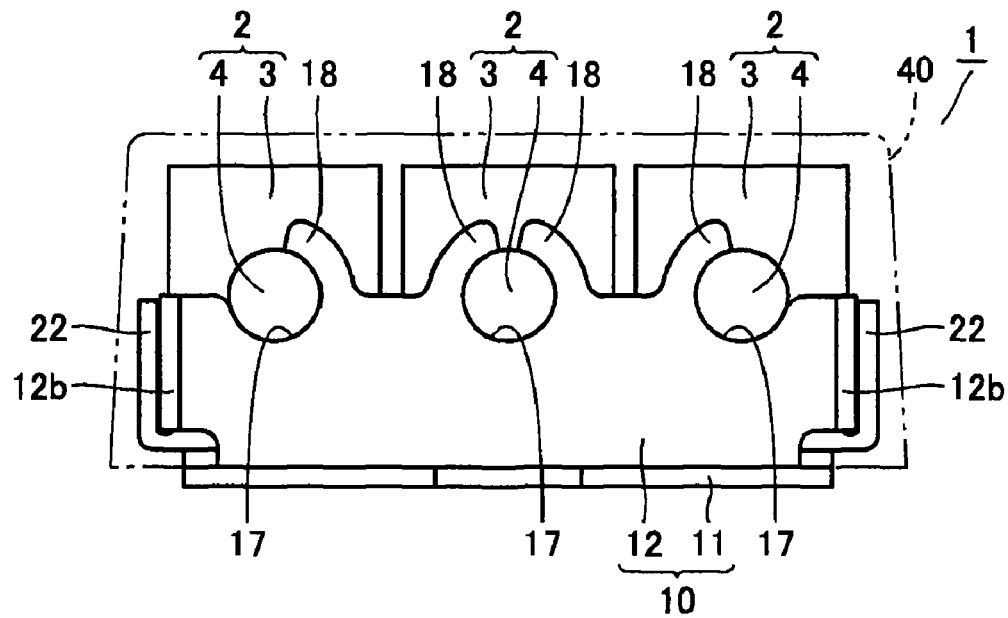
FIG. 40 is a front view showing the solid electrolytic capacitor when three capacitor elements are mounted.
Figure 41:
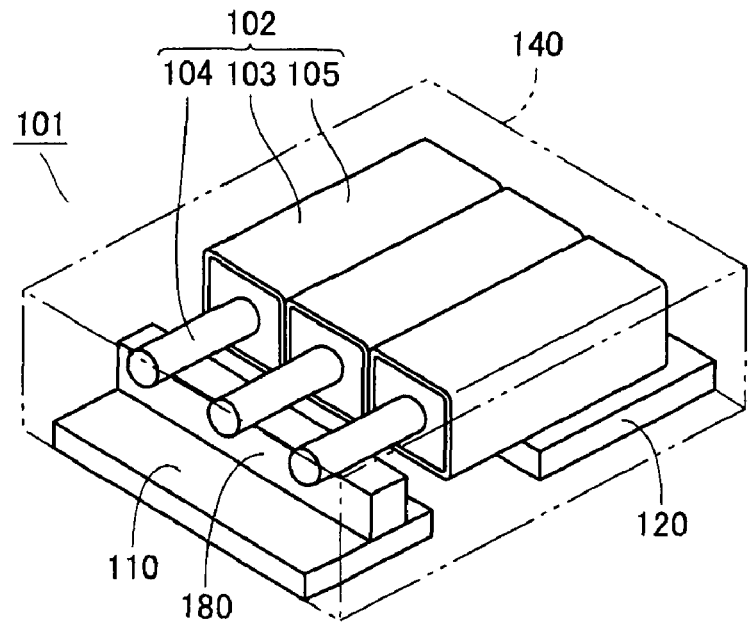
FIG. 41 is a perspective view showing a conventional solid electrolytic capacitor.
Figure 42:
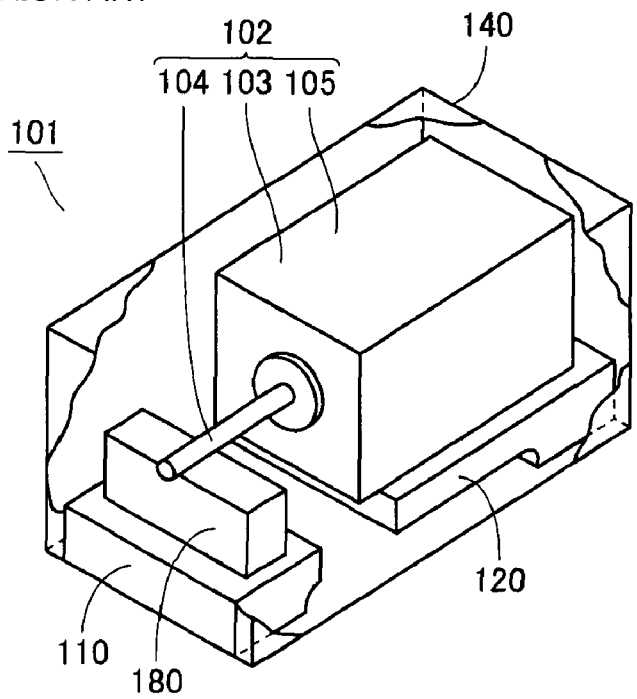
FIG. 42 is a perspective view showing another conventional electrolytic capacitor.

In the foregoing, solid electrolytic capacitor 1 having two capacitor elements 2 has been described as an example of solid electrolytic capacitor 1 (see FIG. 1 etc.). The number of capacitor elements 2 is not limited to two, and solid electrolytic capacitor 1 may have one capacitor element 2 mounted thereon as shown in FIG. 39. Further, solid electrolytic capacitor 1 may have three capacitor elements 2 mounted thereon, as shown in FIG. 40. Further, the solid electrolytic capacitor may have four or more capacitor elements mounted thereon (not shown). In FIGS. 41 and 42, the same components as those of solid electrolytic capacitor 1 shown in FIG. 2 are denoted by the same reference characters.

In the method of manufacturing the solid electrolytic capacitor described above, a method of holding the anode portion of capacitor element on the rising portion by curving the hook portion has been described as an example. After this process, a gap between the anode portion and the rising portion may be filled using a conductive paste. By such an approach, firmer connection between the anode portion and the rising portion can be attained, and the contact area between the anode portion and the rising portion is increased, further reducing ERS.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor, comprising:
a capacitor element having an anode portion and a cathode portion;
a mold resin portion sealing said capacitor element;
an anode lead frame connected to said anode portion from below said anode portion of said capacitor element, inside said mold resin portion; and
a cathode lead frame connected to said cathode portion;
said anode lead frame including
a catching portion receiving and supporting said anode portion from below,
a hook portion holding said anode portion in a surrounding manner, with said anode portion received in said catching portion,
an anode terminal portion exposed along a bottom surface of said mold resin portion, and
a rising portion formed using a member identical to that for said anode terminal portion, and connected to said anode portion,
wherein said catching portion and said hook portion is formed at said rising portion,
said catching portion supports said anode portion from below in a manner to bring a cross sectional portion in said anode lead frame into contact with said anode portion,
said hook portion holds said anode portion in a manner to bring said cross sectional portion into contact with said anode portion.

2. The solid electrolytic capacitor according to claim 1, wherein
said catching portion includes a plane-contact portion to be in plane contact with a surface of said anode portion.

3. The solid electrolytic capacitor according to claim 1, wherein
said catching portion includes a line-contact portion to be in line contact with a surface of said anode portion.

4. The solid electrolytic capacitor according to claim 1, wherein
said rising portion extends from an end of said anode terminal portion closer to said cathode portion of said capacitor element through said mold resin portion toward said anode portion of said capacitor element, and is connected to said anode portion.

5. The solid electrolytic capacitor according to claim 1, wherein
said rising portion includes one and the other side end portions positioned in a direction orthogonal to the direction of said rising portion extending from said anode terminal portion, and
each of said side end portions is bent in a direction away from said cathode portion of said capacitor element.

6. The solid electrolytic capacitor according to claim 1, wherein
said anode lead frame is arranged such that an upper surface of said anode terminal portion is in direct contact with a bottom surface of said mold resin portion.

7. The solid electrolytic capacitor according to claim 1, wherein said cathode lead frame includes
a cathode terminal portion exposed along a bottom surface of said mold resin portion, and
a pair of side surface portions extending from said cathode terminal portion through a step portion and inside said mold resin portion, erected opposite to each other with said cathode portion of said capacitor element placed therebetween and connected to said cathode portion.

8. The solid electrolytic capacitor according to claim 7, wherein
said side surface portion includes
a first side surface portion, and
a second side surface portion positioned on an opposite side to said anode portion with respect to said first side surface portion.

9. The solid electrolytic capacitor according to claim 7, comprising
an extending portion extending from said side surface portion to a side opposite to said anode portion.

10. The solid electrolytic capacitor according to claim 7, wherein
said cathode lead frame is arranged such that an upper surface of said cathode terminal portion is in direct contact with the bottom surface of said mold resin portion.

11. The solid electrolytic capacitor according to claim 1, comprising:
a plurality of said capacitor elements; wherein
said anode portion of each of said plurality of capacitor elements is arranged in the same direction and connected to said anode lead frame.

12. The solid electrolytic capacitor according to claim 11, wherein
with respect to one and the other anode portions of one and the other of two capacitor elements adjacent to each other among said plurality of capacitor elements,
at said one anode portion, said hook portion is formed to surround said one anode portion from the side of said the other anode portion to a side opposite to said the other anode portion, and
at said the other anode portion, said hook portion is formed to surround said the other anode portion from the side of said one anode portion to a side opposite to said one anode portion.

13. The solid electrolytic capacitor according to claim 11, wherein
with respect to one and the other anode portions of one and the other of two capacitor elements adjacent to each other among said plurality of capacitor elements,
at said one anode portion, said hook portion is formed to surround said one anode portion from a side opposite to said other anode portion to a side of said other anode portion; and
at said other anode portion, said hook portion is formed to surround said other anode portion from a side opposite to said one anode portion to a side of said one anode portion.

14. The solid electrolytic capacitor according to claim 1, wherein
said anode portion protrudes like a wire from a body of said capacitor element; and
said hook portion is formed to surround said anode portion from one direction intersecting the direction of protrusion of said anode portion.

15. The solid electrolytic capacitor according to claim 14, wherein said hook portion is formed to surround said anode from one and the other directions intersecting the direction of protrusion of said anode portion.

16. A solid electrolytic capacitor, comprising:
a capacitor element having an anode portion and a cathode portion;
a mold resin portion sealing said capacitor element;
an anode lead frame connected to said anode portion from below said anode portion of said capacitor element, inside said mold resin portion; and
a cathode lead frame connected to said cathode portion;
said anode lead frame including
a catching portion receiving and supporting said anode portion from below;
a hook portion holding said anode portion in a surrounding manner, with said anode portion received in said catching portion;
an anode terminal portion exposed along a bottom surface of said mold resin portion; and
a rising portion formed integral with said anode terminal portion, and connected to said anode portion;
wherein said catching portion and said hook portion are formed at said rising portion;
said rising portion includes one and the other side end portions positioned in a direction orthogonal to the direction of said rising portion extending from said anode terminal portion; and
each of said side end portions is bent in a direction away from said cathode portion of said capacitor element.

17. A solid electrolytic capacitor, comprising:
a capacitor element having an anode portion and a cathode portion;
a mold resin portion sealing said capacitor element;
an anode lead frame connected to said anode portion from below said anode portion of said capacitor element, inside said mold resin portion; and
a cathode lead frame connected to said cathode portion;
said anode lead frame including
a catching portion receiving and supporting said anode portion from below; and
a hook portion holding said anode portion in a surrounding manner, with said anode portion received in said catching portion;
wherein a plurality of said capacitor elements are formed;
said anode portion of each of said plurality of capacitor elements is arranged in the same direction and connected to said anode lead frame;
with respect to one and the other anode portions of one and the other of two capacitor elements adjacent to each other among said plurality of capacitor elements,
at said one anode portion, said hook portion is formed to surround said one anode portion from a side of said other anode portion to a side opposite to said other anode portion; and
at said other anode portion, said hook portion is formed to surround said other anode portion from a side of said one anode portion to a side opposite to said one anode portion.

18. A solid electrolytic capacitor, comprising:
a capacitor element having an anode portion and a cathode portion;
a mold resin portion sealing said capacitor element;
an anode lead frame connected to said anode portion from below said anode portion of said capacitor element, inside said mold resin portion; and
a cathode lead frame connected to said cathode portion;
said anode lead frame including a catching portion receiving and supporting said anode portion from below; and a hook portion holding said anode portion in a surrounding manner, with said anode portion received in said catching portion;

wherein a plurality of said capacitor elements are formed;

said anode portion of each of said plurality of capacitor elements is arranged in the same direction and connected to said anode lead frame;

with respect to one and the other anode portions of one and the other of two capacitor elements adjacent to each other among said plurality of capacitor elements, at said one anode portion, said hook portion is formed to surround said one anode portion from a side opposite to said other anode portion to a side of said other anode portion; and at said other anode portion, said hook portion is formed to surround said other anode portion from a side opposite to said one anode portion to a side of said one anode portion.

* * * * *